US 6,695,994 B2

(12) United States Patent
Bulgrin et al.

(10) Patent No.: US 6,695,994 B2
(45) Date of Patent: Feb. 24, 2004

(54) MELT PRESSURE OBSERVER FOR ELECTRIC INJECTION MOLDING MACHINE

(75) Inventors: Thomas C. Bulgrin, Columbia Station, OH (US); Michael C. Uhrain, IV, Stow, OH (US)

(73) Assignee: Van Dorn Demag Corporation, Strongsville, OH (US)

(*) Notice: Subject to any disclaimer, the term of this patent is extended or adjusted under 35 U.S.C. 154(b) by 315 days.

(21) Appl. No.: 09/968,357

(22) Filed: Sep. 29, 2001

(65) Prior Publication Data
US 2003/0062643 A1 Apr. 3, 2003

(51) Int. Cl.⁷ .............................................. B29C 45/77
(52) U.S. Cl. .................. 264/40.1; 264/40.5; 264/328.1; 425/145; 425/166
(58) Field of Search .............................. 264/40.1, 40.5, 264/328.1; 425/145, 149, 166; 700/200, 203

(56) References Cited

U.S. PATENT DOCUMENTS

| | | | |
|---|---|---|---|
| 4,695,237 A | * 9/1987 | Inaba | 425/135 |
| 4,759,705 A | * 7/1988 | Otake et al. | 425/145 |
| 4,820,464 A | * 4/1989 | Sasaki et al. | 264/40.1 |
| 4,828,473 A | 5/1989 | Otake et al. | |
| 4,887,012 A | * 12/1989 | Kiya et al. | 425/145 |
| 4,961,696 A | 10/1990 | Yamamura | |
| 5,147,659 A | 9/1992 | Watanabe et al. | |
| 5,154,935 A | 10/1992 | Kamiguchi et al. | |
| 5,792,483 A | 8/1998 | Siegrist et al. | |
| 5,804,224 A | 9/1998 | Inaba et al. | |
| 5,911,924 A | 6/1999 | Siegrist et al. | |
| 5,955,117 A | 9/1999 | Ito et al. | |
| 5,997,778 A | 12/1999 | Bulgrin et al. | |
| 6,089,849 A | 7/2000 | Bulgrin et al. | |
| 6,555,035 B2 | * 4/2003 | Iimura et al. | 264/40.1 |

OTHER PUBLICATIONS

Int. Search Report for PCT/US02/308080 (Sep. 27, 2002) Mailed Dec. 6, 2002 –4 Pages.

* cited by examiner

*Primary Examiner*—Jill L. Heitbrink
(74) *Attorney, Agent, or Firm*—Fay, Sharpe, Fagan, Minnich & McKee, LLP

(57) ABSTRACT

Electric injection molding machines and systems are disclosed in which a melt pressure value is provided without pressure sensing through solving one or more state equations using measured motor performance parameters such as position or velocity, and torque or current. The pressure value may be used to control melt pressure during an injection step, or may be used for monitoring. Methods and computer-readable media are also disclosed for providing or estimating melt pressure in an injection molding machine without a melt pressure sensor.

46 Claims, 16 Drawing Sheets

MELT PRESSURE OBSERVER FOR ELECTRIC INJECTION MOLDING MACHINE

FIELD OF INVENTION

The invention relates generally to the art of injection molding and more particularly to methods and apparatus for sensorless observation of melt pressure in an electric injection molding machine.

BACKGROUND OF THE INVENTION

Injection and other types of molding machines are complex systems, typically operated in multiple steps or phases, in order to provide a molded part or parts in a molding cycle. Once a finished part is ejected or removed from the machine, the molding cycle is repeated to produce further parts. A typical injection molding machine operational cycle includes clamp, inject, pack and hold, recover, and eject steps, each of which involves moving machine components and motion control thereof. The clamp phase joins the individual sides or portions of a mold together for receipt therein of pressurized plastic molding material, in the form of a melt. In the inject phase, a reciprocating feed screw or ram within a cylindrical barrel pushes or injects the plasticized melt through an orifice at the barrel end or nozzle, which in turn provides the melt to the interior cavity of the mold. Further material is then provided to the mold and pressure is maintained during a pack and hold step, and the eject step separates the molded part from the separated mold halves. The screw is retracted in the barrel during a recovery step while the screw is rotated to advance new plastic material through screw flights into the barrel space forward of the screw, whereupon the cycle may be repeated.

In the United States, injection molding machines have traditionally been hydraulic machines. Within the last several years, there has been a general shift to electrically powered machines either in hybrid arrangements (where some machine functions are performed by electric motors while others hydraulically) or in an all-electric machine. The machine cycle is the same whether the injection molding machine is electrical or hydraulic. However, there are major differences in the hardware required to perform the sequences in the molding cycle. The hardware differences require control changes to the machine so that the user of an electric injection molding machine can perform the same types of control traditionally performed when molding with hydraulic machines.

Controls for injection molding machines have evolved from early manual controls wherein plastic was injected into a mold when a crank wheel was turned, to programmable logic controllers operating the machine actuators in closed loop fashion using sensor inputs to implement a control law, typically proportional, integral, derivative (PID) control. More recently, molding machine controllers have provided more advanced functionality, such as combining auto-tuned PID with a predictive open-loop term and an adaptive learned disturbance correction term, as set forth in my U.S. Pat. No. 5,997,778, the disclosure of which is hereby incorporated by reference as if fully set forth herein. The present invention provides various improvements over the conventional molding machines and control systems therefor illustrated and described in U.S. Pat. No. 5,997,778.

Of particular importance is the motion of the in-line reciprocating screw or ram during injection and also the control of the ram during hold and pack. This is necessary to achieve acceptable molded parts, for example, by insuring complete filling of the mold, reducing cosmetic and structural problems in the molded parts, ejecting molded parts without damage and minimizing cycle time to achieve acceptable machine throughput.

Control of the ram motion during inject is typically accomplished in one of two ways. In a first method, the velocity of the ram along its travel is set at desired velocities at desired travel distances by the operator. The velocity of the ram is thus profiled and typically the control monitor will show the programmed velocity as a trace and the actual trace achieved during injection. When velocity profiling is used, the machine transitions from a motion control to a pressure control during hold. That is, the shrinkage of the melt while the plastic starts to cure is made up of additional plastic pushed into the mold as a function of the packing pressure desired to be exerted on the plastic in the mold. Still further, when velocity profiling is used, the machine control will monitor and can display the pressure on the ram, sometimes in an overlaid display, to allow the operation to better set the velocity profile. In any event, the pressure is typically monitored and values displayed when velocity profiling is used.

The second method to control the ram is by pressure and not velocity. Pressure profiling is similar to velocity profiling in that the operator sets pressure at specified ram positions to achieve desired profiling. While velocity profiling is widely used, there are applications where pressure profiling is desired. For example, gas injection mold technology may require ram pressure control to achieve a desired gas pressure in the mold.

In a conventional hydraulic machine, an inexpensive pressure sensor(s) is located in the hydraulic circuit. The hydraulic pressure is directly sensed and a good portion of the entire control system is governed by the pressure in the hydraulic circuit. Because of the mechanical arrangement used to mount the hydraulic actuator, i.e., piston, a direct correlation between the pressure used to push the ram and the pressure in the mold is obtained. Unless an intricate mold is used, the hydraulic pressure on the ram can be easily correlated to the pressure of the melt in the mold. Thus, pressure profiling is provided at no cost in a hydraulic machine. The hydraulic circuit sensor needed to operate the machine provides the sensor information for machine control.

An entirely different problem is present with an electric machine. First, the rotation of an electric motor has to be converted to linear motion, typically accomplished by a ball screw. To permit translation and rotation of the ram (screw), a tie-bar structure, not dissimilar to that used for the platens of a mold is typically employed. The ball screw pushes a plate sliding in a guided manner on the tie-bars secured to the ram (screw) to achieve translation. This mechanical arrangement does not provide the inherent pressure reading available in a hydraulic machine to sense pressure. What is done then is to provide a melt pressure sensor in the barrel or mold to sense the pressure. However, melt pressure sensors do not operate in the pristine environment of the pressure sensors in the hydraulic circuit where the sensor is exposed to clean fluid at low temperatures. Basically, the melt pressure sensor is an expensive instrument with a short finite life. Further, and somewhat surprising, the melt pressure sensor may not necessarily give a true accurate or absolute reading of the actual pressure in the mold and may not have sensitivity or response time to truly pick up variations in the melt. However, in most cases, the melt sensor will give a consistent reading. Furthermore, if a melt sensor is used on the machine and not the mold, special nozzles or nozzle adapters are frequently required to mount the pressure transducer in the machine barrel, and, in all events, the transducer needs to be calibrated upon installation and periodically thereafter. Calibration and changeout of failed barrel mounted pressure sensors are off-line procedures causing machine down-time, and are typically beyond the expertise of mold operators. This is in addition to external signal conditioning and/or amplification. Thus, several shortcomings make direct transducer measurement of melt pressure less than desirable.

The prior art has recognized this and has used a force transducer (i.e., strain gage, load cell) to measure the axial force executed on the ram (typically, vis-a-vis the mounting plate). See, for example, U.S. Pat. 4,828,473, 4,961,696 and 5,955,117.

In the prior art, for example, strain gage sensors or load cells are mounted so as to measure compression on the ram or some other component in line between the linear (e.g., motorized) actuator and the plasticized melt. The compression of the ram, for instance, is generally related to the strain at the measurement point, and is also roughly proportional to the total force thereat. Because the majority of the force on the ram is due to the melt pressure resistance, such strain gages have heretofore been used to provide an estimate of the melt pressure. However, this technique does not provide exceptional accuracy, due to the inability to discriminate between melt pressure and other forces on the ram.

More particularly, the movement of the ball screw actuator encounters frictional forces which are not necessarily consistently repeatable in magnitude. In addition, there is a stretch or deformation of the mechanical components, such as the tie rods, which are also not necessarily consistently repeatable. These inconsistent variables are inherent to any mechanical system in the electric drive inject mechanism. This means that a force transducer in the electric drive machine cannot give consistent readings in contrast to, say, the consistency of the readings of melt or liquid pressure sensors.

Further, load cells and strain gages require sensors and high-gain amplifier components. Moreover, the relationship between force and the resulting deflection at the strain gage is typically non-linear, resulting in inaccuracies at certain regions of pressure operation. Thus, strain gage and load cell techniques suffer from high cost, lack consistency, and do not provide accuracy required for improved molding machine control, particularly during peak velocity or high pressure conditions.

Whether direct pressure sensor transducers or strain gages are employed in conventional molding machines, signal conditioning and amplification circuitry must be provided, in order to convey a pressure indicative signal to the machine control system. Such circuitry adds to the cost of operating the machine. Furthermore, such circuitry typically suffers from drift over time, and which may vary due to fluctuations in operating temperature. Moreover, since strain gage amplifiers are typically high gain devices, electrical noise (e.g., EMI or RFI) susceptibility may cause inaccurate or unusable pressure measurements, particularly in the presence of rotating electrical machinery (e.g., such as electric motors in an electric molding machine) or power supplies therefor (e.g., variable speed motor drives and the like). Although filtering techniques can be employed to reduce the noise susceptibility in such amplifiers, such filtering reduces the response time of the sensor signal circuitry, resulting in signal latency which may be unacceptable in attempting to attain precise control of the molding machine injection step.

It should also be noted that the electrical drives of the electric injection molding machine motors control the motor by torque or torque limiting controls. Specifically, it is known to control pack pressure by limiting the torque value of the motor correlated to maximum pack pressures set by the operator. Within the prior art, there are certain control schemes that transition the machine from velocity control to torque limit control for pack to effect a "seamless" transition. That is, the motor can be set to reach a pre-set torque believed adequate to produce a desired pack pressure which is, generally speaking, steady state. Since the motors will ramp to the torque limit, transitions are provided. While the machine controller can be programmed to provide the torque limit command to the drive, there is no ability to provide a command to the drive which varies to account for the system variables to produce a desired pressure unless the pressure is directly sensed. As a general observation, it is noted that while the drive for the motor will provide an instantaneous read of the motor current draw, there is no attempt to analyze that signal to determine what portion is attributed to pressure. Simply reading a current or controlling the motor current, without more, will not suffice.

Thus, conventional melt pressure measurement and estimation techniques and systems do not provide optimal indication of the actual melt pressure so as to allow improved control of injection molding machines. Consequently, there remains a need for improved apparatus and methodologies by which improved control over, and monitoring of melt pressure can be achieved, without adversely impacting molding machine cost and operational maintenance.

SUMMARY OF THE INVENTION

The following presents a simplified summary of the invention in order to provide a basic understanding of some aspects of the invention. This summary is not an extensive overview of the invention. It is intended neither to identify key or critical elements of the invention, nor to delineate the scope of the invention. Its primary purpose is to present some concepts of the invention in a simplified form as a prelude to the more detailed description that is presented later. The present invention involves techniques and apparatus for sensorless control and monitoring of melt pressure in injection molding machines, by which improved control capabilities and reduced cost can be achieved, in comparison to conventional melt pressure sensing and estimation techniques. In this regard, the invention facilitates mitigation or avoidance of the above mentioned and other difficulties associated with direct or indirect melt pressure measurement and/or control in the prior art (e.g., such as pressure transducers, strain gages, load cells, and the like).

The invention relates to methods and apparatus for estimating or observing melt pressure in an injection molding machine, without the need for direct measurement thereof. In particular, the invention finds application in association with electric or hybrid electric molding machines, wherein hydraulics are not used to actuate the ram during an injection step. Employment of the various aspects of the invention further allows elimination of costly and often difficult to maintain sensor and pre-amplifier components (e.g., and/or strain gage devices) from injection molding machines. Additionally, the invention provides for melt pressure control and/or monitoring in the situation where a barrel or cavity mounted pressure transducer has failed, and does not suffer from the noise susceptibility issues present in conventional molding machines. Furthermore, the invention provides melt pressure estimates where frictional and other loss forces have been taken into account, such that the melt pressure value provided is a better estimate of the actual melt pressure than was previously possible. Thus, the invention provides significant advantages over conventionally employed pressure melt measurement techniques and devices.

In accordance with one aspect of the present invention, there is provided injection molding machine apparatus and controls therefor, having a model representative of the machine behavior and a melt pressure observer. The model may comprise one or more state equations, some or all of which may be differential equations. The observer component receives one or more input values from the injection molding machine or from devices associated therewith, and uses these to provide an estimate for the melt pressure using the model component. For instance, the model may comprise a melt pressure equation expressed as a function of motor acceleration and torque associated with an electric translational drive motor. A first input may represent motor velocity or position and a second input value may represent motor current or torque, wherein the observer provides a current melt pressure value according to one or both of the first and second input values using the model. The current melt pressure value is thus obtained without directly sensing the melt pressure, whereby an injection molding machine may be operated so as to control melt pressure, without the cost, maintenance, and other shortcomings associated with conventional melt pressure sensing techniques. The first and second input values may be obtained from dedicated sensors associated with the molding machine, and/or directly from a motor drive associated with the translational electric motor. Thus, the invention may be employed to facilitate sensorless pressure control or monitoring in injection molding machines.

The melt pressure value so obtained may be used in controlling the machine, for monitoring purposes, and/or combinations thereof. For example, during an injection step of a molding machine cycle, velocity profiling may be performed for an initial boost period to a first cutoff point while melt pressure is monitored to avoid exceeding a preset pressure limit value. Thereafter in a pack/hold step, pressure may be controlled according to a pressure vs. time profile, wherein the observed melt pressure value is provided as feedback to an injection machine control law, which in turn provides a control output to a drive motor associated with the injection ram. In this regard, a control system operatively coupled with a motor drive to control the longitudinal translation of the injection ram may comprise a control law providing a control signal to the motor drive according to a current machine state so as to effectuate a desired translation of the injection ram in a controlled fashion. The current machine state may comprise the current melt pressure value, wherein the control law provides the control signal to the motor drive according to the current melt pressure value. In this manner, pressure control can be achieved without pressure sensing. The present invention advantageously provides an indication of the melt pressure without the use of external sensors or strain gages, and the cost and noise sensitivity issues associated therewith. In addition, melt pressure can be monitored or used for control where one or more such sensors have failed.

The model may include one or more state equations, which are solved by the observer component to yield the current machine state. For example, a melt pressure equation may be provided, which is a function of motor acceleration and motor torque. The melt pressure observer solves the melt pressure equation using the first and second input values to provide the current melt pressure value. Thus, where the first input value represents the drive motor velocity, the acceleration can be derived using differentiation, which is then used to solve the melt pressure equation. The differentiation may be accomplished using various digital filtering techniques, such as a Hamming window or other numerical methods. Where the first input value is a position indication, the velocity and ultimately the acceleration can be derived therefrom for use in the melt pressure equation. Similarly, where the motor drive or other sensor provides a second input value indicative of motor torque, this can be directly used to solve the melt pressure equation. Alternatively, where a motor current indication is available (e.g., from a dedicated sensor or from the motor drive), motor torque can be derived therefrom, such as by using a lookup table or a torque equation in the model. The model and the observer, moreover, can account for non-linearities, noise, or other physical characteristics of the molding machine to provide a more accurate indication of the actual melt pressure than was possible using direct sensing techniques. For example, the melt pressure equation can take into account frictional forces associated with the translation of the injection ram. Thus, where a direct sensor cannot differentiate between such frictional forces and the actual melt pressure forces, the invention allows such forces to be subtracted or otherwise accounted for before rendering a melt pressure value.

Another aspect of the present invention involves methods for estimating a melt pressure associated with the longitudinal translation of an injection ram in an injection molding machine having an electric motor. The methods may be implemented, for example, in control systems associated with electrically driven injection molding machines, including but not limited to object oriented software implementations in PC based machine control systems, and/or combinations of hardware and software. The methods comprise obtaining a first input value indicative of a velocity or a position associated with an electric motor, and a second input value indicative of a current or a torque associated with the electric motor. One or more state equations are then solved according to the first and second input values in order to provide a current melt pressure value. The melt pressure value can be used for monitoring or for controlling the molding machine operation. Where pressure is being controlled in the machine, the method can further comprise providing a control signal to a motor drive associated with the electric motor according to a current machine state so as to achieve a desired translation of the injection ram in a controlled fashion, where the current machine state comprises the current melt pressure value. The invention further comprises computer-readable media having computer-executable instructions for controlling the longitudinal translation of an injection ram in an injection molding machine using an electric motor, by which sensorless indication of melt pressure can be facilitated.

It is a particularly important feature of this invention to provide in an all electric molding machine where the screw or ram is translated by an electric motor through a mechanical drive arrangement, a control system which does one or more of the following:

1) senses pressure indicative of the melt pressure without having a force transducer or pressure transducer sensing the force on the screw or the pressure on the melt;
2) provides pressure profiling without using the force transducer or pressure transducer in item 1; and/or,
3) provides hold and pack and transition to a set pressure relative to existing pressure without sensing existing pressure by a force transducer or pressure transducer.

Another aspect of this invention resides in its ability to provide a control system which can consistently sense melt pressure in an electric machine with a mechanical drive notwithstanding variations that occur in the mechanical drive during its operation even if the same operation is repeated.

Still another aspect of this invention resides in a control system which, without the presence of a melt transducer or a force transducer measuring a force indicative of a melt pressure, is able to provide a measurement indicative of the melt pressure which is consistently sensitive and responsive to changes in the melt pressure to control the machine.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
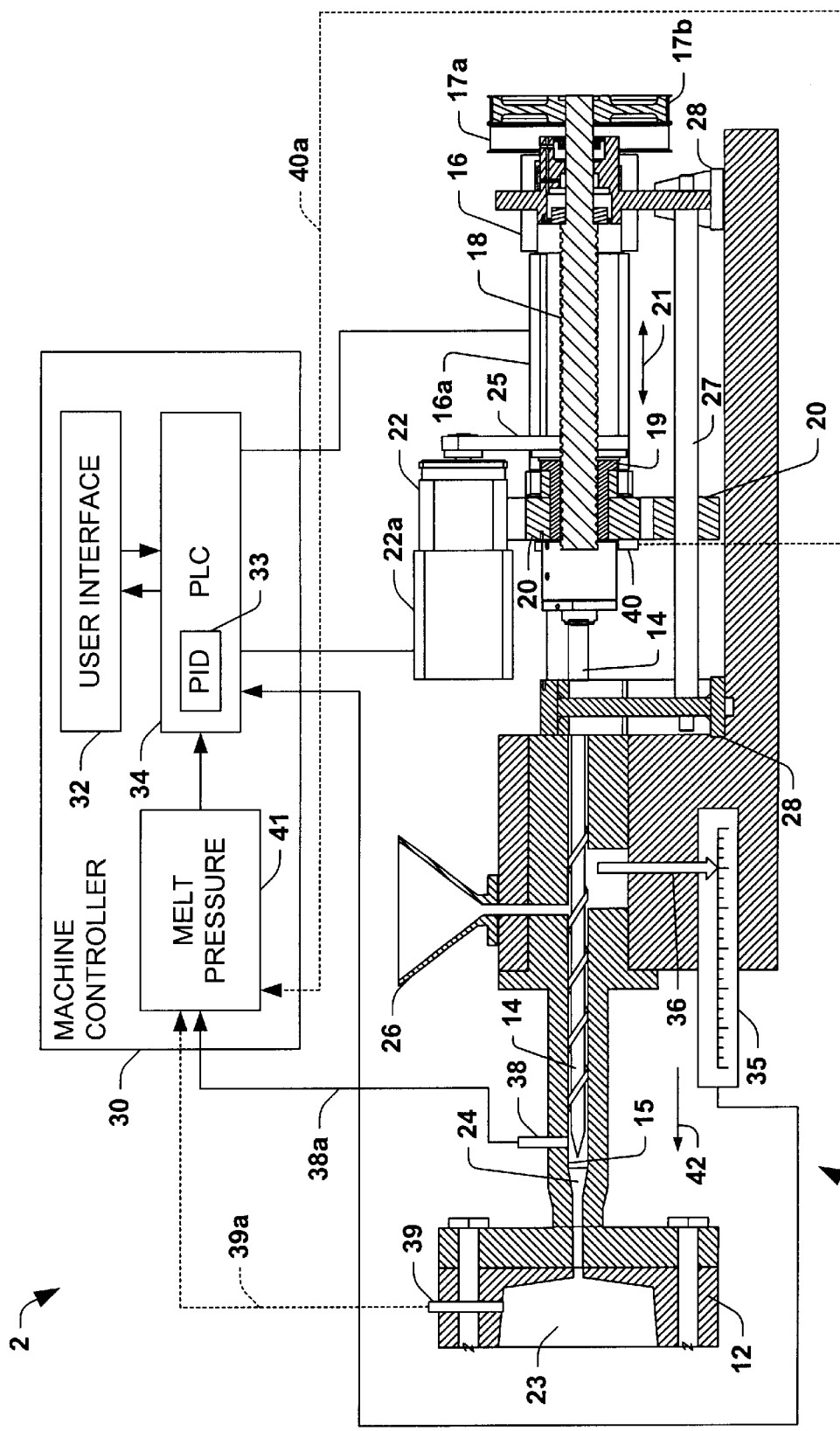
FIG. 1 is a partial side elevation view in section illustrating a conventional electric injection molding machine having a barrel mounted transducer or sensor providing a melt pressure value to a programmable logic controller.

One or more exemplary implementations of the present invention will now be illustrated and described with reference to the drawings, wherein like reference numerals are used to refer to like elements throughout. The present invention relates to apparatus and methods for providing melt pressure vales without sensing pressure or strain in an injection molding machine. Several exemplary implementations of the invention are illustrated and described hereinafter in conjunction with electrically actuated molding machines. However, it will be appreciated that the invention may be employed in association with other types of molding machines, and may be implemented using components such as models and/or observers apart from those illustrated and described herein.

Referring now to FIG. 1, a conventional electric injection molding machine 2 is illustrated having an injection mechanism 10, with a portion of a clamp mechanism and a mold mechanism 12 also shown. The injection mechanism 10 includes an injection screw or ram 14 translatably and rotatably disposed within a tubular barrel 15 and a first electric motor 16 with a motor drive 16a, where the motor 16 is belt-coupled with a pair of pulleys 17a and 17b to rotate first ends of a pair of ball screws 18 having second ends rotatably engaging with corresponding ball nuts 19 in a vertical brace member 20 for longitudinal translation of the member 20 in the direction of arrow 21. The ram 14 is rotatably mounted to the brace member 20 for rotation via a second motor 22 with a corresponding motor drive 22a via a belt 25 and appropriate pulley (not numerically designated. The brace member 20, in turn, is slidably mounted for linear translation along horizontal rails 27 mounted between supports 28. The motors 16 and 22 may thus cause linear translation and/or rotation of the ram 14 during various operational steps of a molding cycle in the machine 2 in a controlled fashion according to signals from the corresponding drives 16a and 22a, respectively. For example, during an injection step, the screw 14 is translated longitudinally forward in the direction of arrow 42 towards the mold mechanism 12 to inject molding material, sometimes referred to as a "melt" (not shown), from the barrel 15 into a mold cavity 23.

The melt is initially fed from a hopper 26 into the interior of the barrel 15 and compressed and melted through rotation of the ram 14 using the rotational drive motor 22. In addition, heating devices (not shown) are employed to heat the molding material in the barrel 15 so as to create the melt. A typical injection stroke or step of the molding cycle begins when molding material pushed by the ram 14 leaves an open end 24 of the barrel 15 (which includes a shut-off valve, not shown) and enters the mold cavity 23, and continues until the mold cavity 23 is initially filled with molding material whereat the injection stroke ends. Further movement of the ram 14 is thereafter controlled in packing and holding step of the molding cycle, so as to supply additional molding material to the mold cavity 23 to account for volumetric contraction as the molding material solidifies. Velocity or pressure profile type control is typically employed in the injection step, and pressure profiling is commonly used in the pack and hold steps. During injection, the translational motion of the vertical brace member 20 via the pulleys 17, ball screws 18 and ball nuts 19, causes translational movement of the ram 14 in the direction of arrow 42, and is controlled by signals from a machine controller 30 to the associated motor drive 16a.

The machine controller 30 controls the operation of injection mechanism 10 and a other subsystems in the machine 2, such as for clamping the mold 12, heaters for temperature control of the barrel 15, ejector systems for ejecting molded parts from the mold 12, or the like. The machine controller 30 includes a user interface or operator console station 32 at which an operator enters data or set points defining how the machine is to be operated, along with a programmable logic controller (PLC) 34. The PLC 34 receives the operator instructions and sensor inputs from the machine, processes the data and generates control output driving signals to actuators such as the motors 16 and 22 in the machine 2 for controlled operation thereof according to a proportional integral, derivative (PID) control component 33. The control component 33 may, but need not, include all three factors of the PID, and also may include additional factors, such as for preventing integral windup.

Various sensors and/or transducers may provide control type feedback signals to the controller 30. For instance, the machine 2 has a ram travel position sensor 35 generating a position signal 35a, wherein the position is schematically illustrated by an arrow 36. Where melt pressure is of interest, such as during pressure profiling or velocity profiling with pressure limiting, the machine 2 comprises a barrel mounted pressure sensor 38 providing pressure signal 38a. Alternatively or in combination, the machine can include a mold cavity pressure sensor 39 providing a pressure signal 39a, and/or a strain gage or load cell 40 to measure strain or pressure and provide a strain signal 40a. The pressure sensors 38, 39, and the strain gage/load cell 40 may further comprise pre-amplifier components (not shown) providing amplified and conditioned (e.g., filtered) signals 38a, 39a, and 40a to the machine controller 30. Any of the sensor signals 38a, 39a, or 40a may be used to generate a melt pressure value 41 in the controller 30, which may be used for control or monitoring purposes. Other sensors (not shown) may be installed in the machine 2 to provide corresponding sensor signals to the controller 30. The machine controller 30, in turn, provides control output or drive signals to various actuators in the machine 2, such as the motor drives 16a and 22a associated with motors 16 and 22, respectively, for operation thereof in a controlled fashion.

Although the sensors 38, 39, and/or 40 provide some measure of the melt pressure, each of these suffers from one or more shortcomings, as described above. For instance, melt pressure transducers 38 and 39 suffer from relatively short life expectancies and special nozzles or nozzle adapters (not shown) are needed to mount the pressure transducers 38 or 39 in the machine barrel 15 or the mold 12, respectively. Furthermore, the transducers or sensors 38 and 39 need to be calibrated upon installation and periodically thereafter. The pressure sensors 38 and 39, as well as the strain gage/load cell 40 and associated amplifier (not shown) also have other undesirable shortcomings. In particular, these devices are unable to distinguish or discriminate between melt pressure forces and other forces on the ram 14. In addition, the relationship between the melt pressure and the resulting deflection at the strain gage 40 is generally nonlinear, resulting in inaccuracies at certain regions of pressure operation. Thus, the sensing devices 38, 39, and 40 have heretofore failed to provide optimal indication of melt pressure for use in monitoring or control of the machine 2, because of which truly optimal control thereof has been inhibited.

Figure 2:
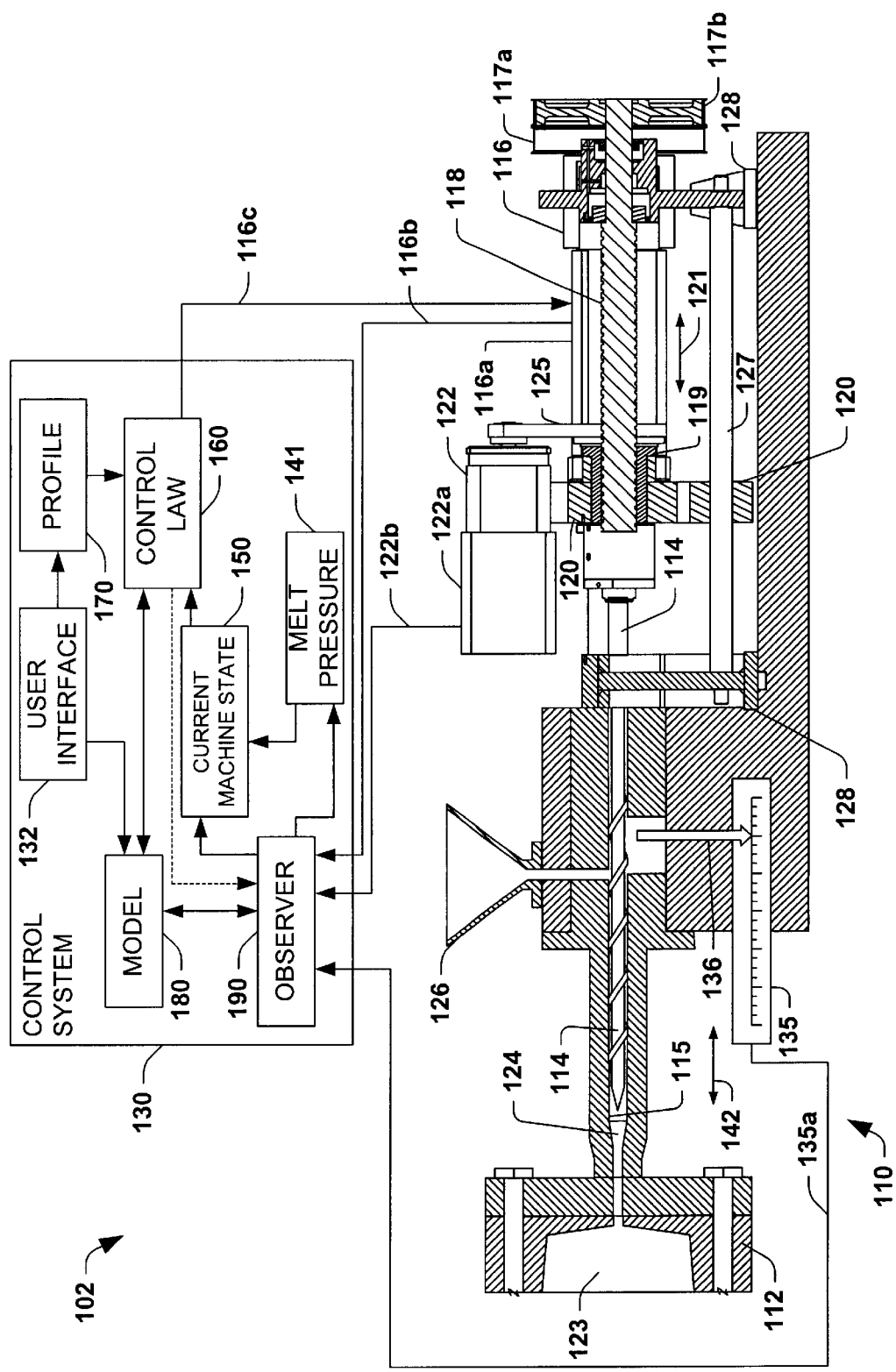
FIG. 2 is a partial side elevation view in section illustrating an exemplary electric injection molding machine and a control system providing for sensorless indication of melt pressure in accordance with one or more aspects of the present invention.
Figure 3:
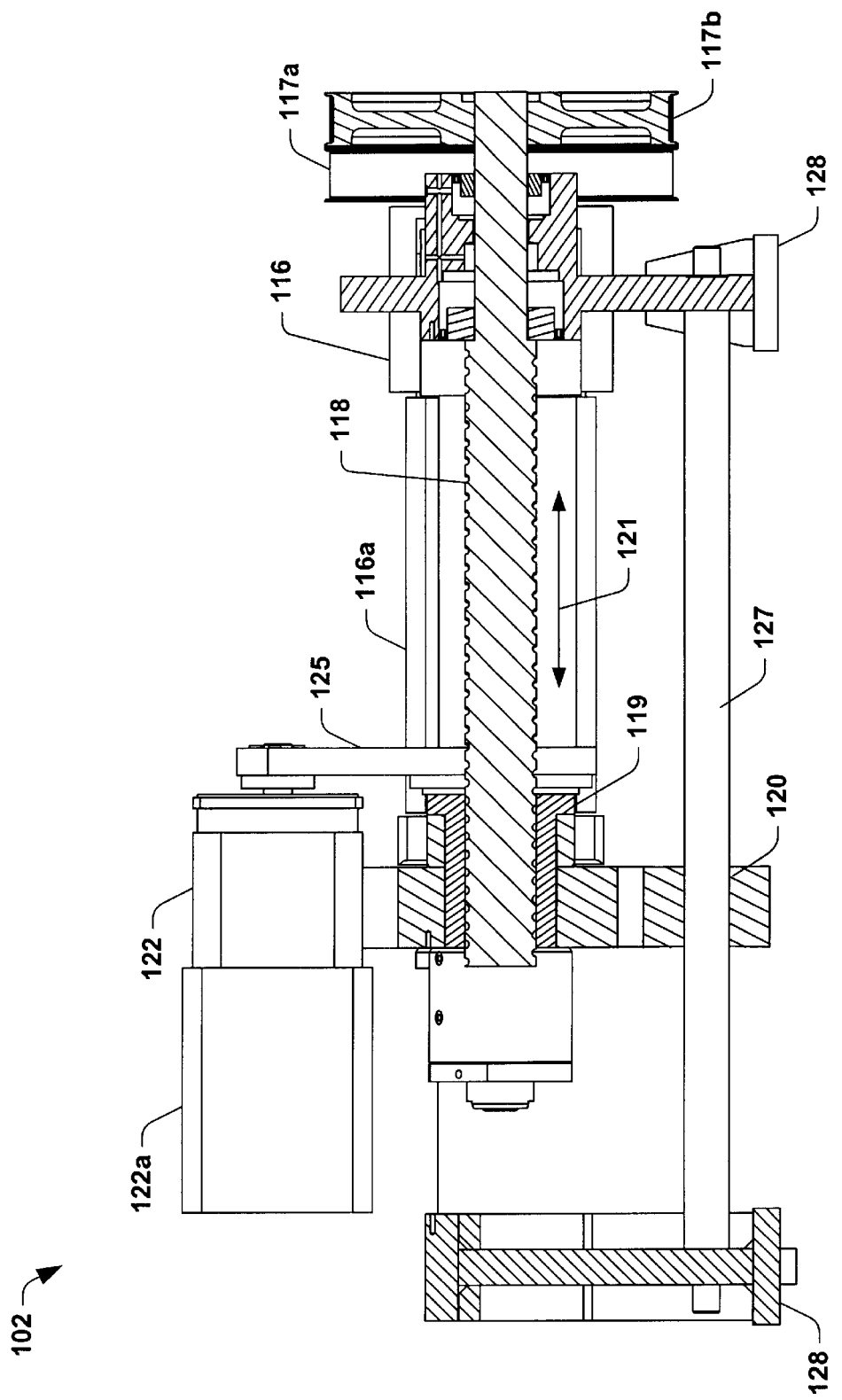
FIG. 3 is a side elevation view taken in section along line 3—3 of FIG. 4 illustrating a portion of the exemplary molding machine of FIG. 2, and further illustrating the electric motor driven rotational and translational actuators for the injection ram thereof.
Figure 4:
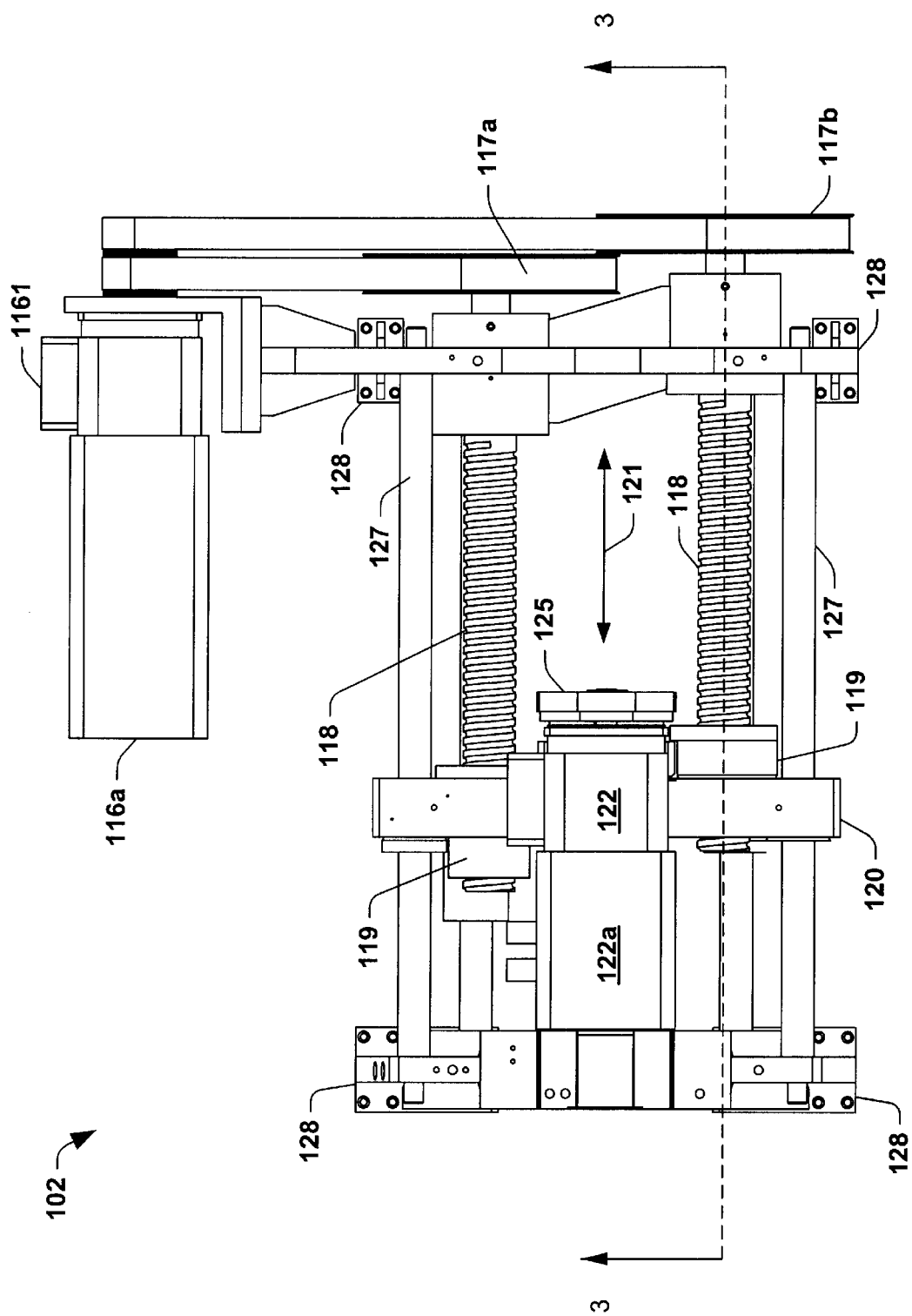
FIG. 4 is a top plan view further illustrating of a portion of the exemplary molding machine of FIGS. 2 and 3.
Figure 5:
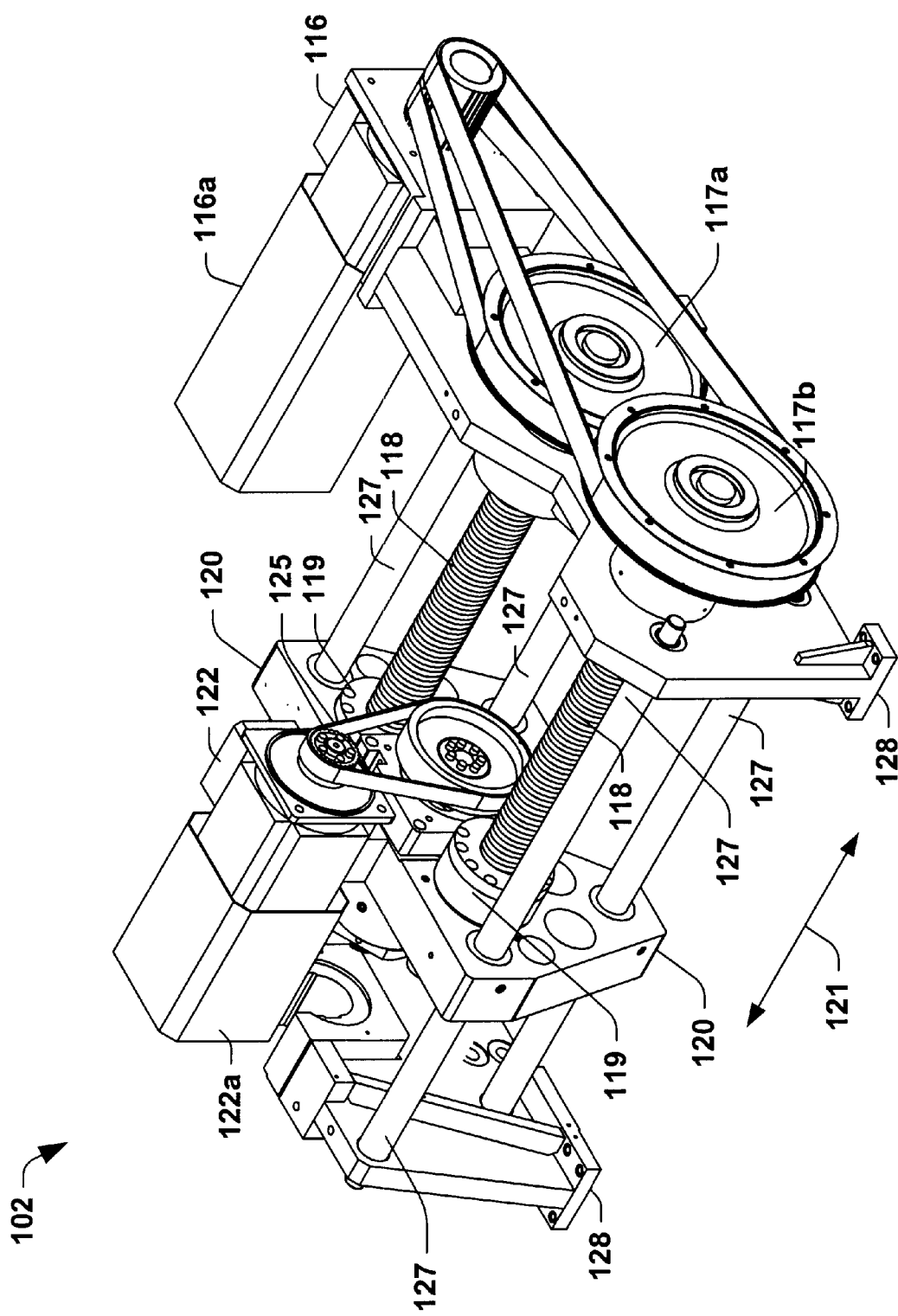
FIG. 5 is a perspective view further illustrating of a portion of the exemplary molding machine of FIGS. 2–4.

Referring now to FIGS. 2–5, the present invention allows improved pressure and/or velocity profiling and other types of control of the ram translation during injection, pack, or hold steps by providing a melt pressure value without the need for pressure sensing devices (e.g., such as sensors 38, 39, or 40 of FIG. 1). This facilitates cost savings in molding machines, reduced maintenance and downtime, and further provides melt pressure values from which frictional and other non-melt pressure sources can be extracted, to thereby allow more precise control and monitoring of the molding process. In particular, FIG. 2 illustrates an electric injection molding machine 102 having an electrically actuated injection mechanism 110 for injecting a plasticized melt (not shown) into an interior cavity 123 of a mold 112 using a ram screw 114 in controlled fashion. The machine 102 includes or is operatively associated with a control system 130 in accordance with various aspects of the present invention, by which improved control of one or more component motions and/or pressures in the machine 102 can be achieved.

The injection mechanism 110 includes an injection screw or ram 114 translatably and rotatably disposed within a tubular barrel 115 and a first electric motor 116 with a motor drive 116a is belt-coupled with a pair of pulleys 117a and 117b to rotate first ends of a pair of ball screws 118 having second ends rotatably engaging with corresponding ball nuts 119 in a vertical brace member 120 for longitudinal translation of the member 120 in the direction of arrow 121. The ram 114 is rotatably mounted to the brace member 120 for rotation via a second motor 122 with a corresponding motor drive 122a via a belt 125 and appropriate pulley (not numerically designated. The brace member 120 is slidably mounted for linear translation along horizontal rails 127 mounted between supports 128. The motors 116 and 122 may thus cause linear translation and/or rotation of the ram 114 during various operational steps of a molding cycle in the machine 102 in a controlled fashion according to signals from the corresponding drives 116a and 122a, respectively. For example, during an injection step, the screw 114 is translated longitudinally forward in the direction of arrow 142 towards the mold mechanism 112 to inject molding material, sometimes referred to as a "melt" (not shown), from the barrel 115 into the mold cavity 123.

The melt is initially fed from a hopper 126 into the interior of the barrel 115 and ground into fine particles through rotation of the ram 114 using the rotational drive motor 122. In addition, heating devices (not shown) are employed to heat the molding material in the barrel 115 so as to create the melt. A typical injection stroke or step of the molding cycle begins when molding material pushed by the ram 114 leaves an open end 124 of the barrel 115 (which includes a shut-off valve, not shown) and enters a mold cavity 123, and continues until the mold cavity 123 is initially filled with molding material whereat the injection stroke ends. Further movement of the ram 114 is thereafter controlled in packing and holding phase of the molding cycle, so as to supply additional molding material to the mold cavity 123 to account for volumetric contraction as the molding material solidifies. Velocity or pressure profile type control is typically employed in the injection step, and pressure profiling is commonly used in the pack and hold steps. During injection, the translational motion of the vertical brace member 120 via the pulleys 117, ball screws 118 and ball nuts 119, causes translational movement of the ram 114 in the direction of arrow 142, and is controlled by signals from a machine controller 130 to the associated motor drive 116*a*.

The exemplary control system 130 comprises a PC based hardware platform with microprocessor, memory (e.g., RAM, ROM, etc), and I/O circuitry for sending and receiving data to or from a user and/or a network (not shown). The various operational components of the control system 130 illustrated and described hereinafter may be implemented as software components or objects running in the hardware platform, which may be stored in, and operate on, various data in a data store in memory. It will be appreciated that the control apparatus and melt pressure observer according to the invention are not limited to such PC based hardware/software implementations, and may comprise various forms of hardware, software, and combinations thereof. The control system 130 further comprises appropriate signal conditioning, amplification, and conversion circuitry (e.g., A/D and D/A converters) so as to receive and quantify sensor input signals from various sensors in the machine 102, as well as to provide control output or drive signals to the various actuators therein.

For instance, the control system 130 receives sensor input signals 116*b*, and 122*b* from motor drives 116*a* and 122*a*, which may comprise motor related information such as motor position or velocity, and current or torque. In particular, the motor drive 116*a* associated with the linear translation motor 116 may provide position or speed and current or torque information to the control system 130, from which melt pressure observations can be made in accordance with an aspect of the invention. Alternatively or in combination, the control system 130 may obtain position information from a position sensor 135 via a position signal 135*a* as indicated by arrow 136 or from rotary encoders or resolvers (not shown) associated with the linear translational drive motor 116. Furthermore, motor current and/or torque information may likewise be obtained from sensors (not shown) in the machine 102 as an alternative or in addition to obtaining such information directly from the drive 116*a*.

The control system 130 derives a current machine state 150 (e.g., such as a state vector) using an observer component 190, where the current machine state 150 includes a current melt pressure value 141, from one or more input values related to the machine 102 without pressure sensing. As illustrated and described further hereinafter with respect to FIGS. 7 and 8*a*, the observer 190 comprises a melt pressure observer component 190*a* providing a melt pressure value 150*a* as part of the current machine state 150, according to an aspect of the invention. The current machine state 150 is generated and updated in each control cycle of the control system 130 by the observer 190, and is provided to or is accessed by a control law 160. For example, the current machine state 150 may be stored as an array or a state vector in memory or a data store in the control system 130, which may be accessed as needed by the control law 160 and periodically updated every control cycle period (e.g., 1 ms). The control system 130 may input other sensor signals and/or data from other devices via sensor inputs and network communications connections (not shown) apart from those illustrated and described herein, which may be used for constructing the current machine state 150, updating the machine model 180 or the profile 170, and may also provide output information (e.g., control output values, diagnostic information, etc.) to actuators and other devices not specifically illustrated herein, via signal lines and/or communications mediums (not shown). The control law 160 receives or accesses a profile 170, such as a series of desired future velocity or pressure states associated with the ram 114, which comprises or is otherwise derived from user-defined velocity or pressure values obtained from a user interface 132 in the control system 130.

Figure 13:
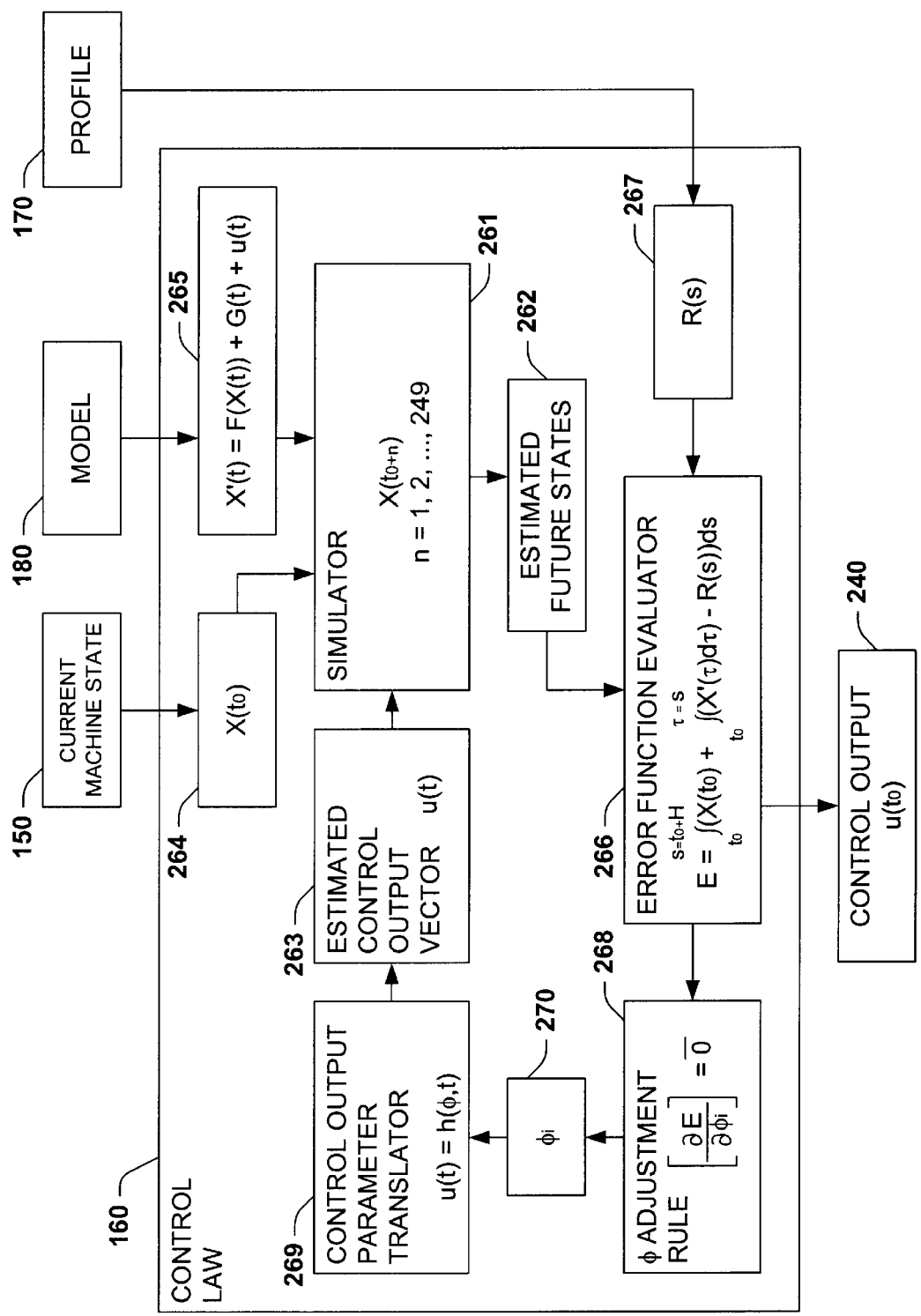
FIG. 13 is a schematic diagram illustrating an exemplary control law in accordance with the present invention; and, FIG. 14 is a graph illustrating force versus time curves derived from a pressure transducer, a strain gage, and a melt pressure observer and model in accordance with the present invention.

The exemplary control law 160, as illustrated and described in greater detail hereinafter with respect to FIG. 13, provides one or more control output signals or values to various actuators in the machine 102 based on the current machine state 150 and estimation of future states using a proposed control output vector and a model 180 of the machine 102 or a portion thereof. For instance, the control law 160 provides a command or control signal 116*c* to the motor drive 116*a* for controlled linear translation of the ram 114 via the motor 116, ball screws 118, ball nuts 119, and brace member 120. Although the exemplary control law 160 illustrated and described hereinafter provides for iterative or recursive model predictive control, the present invention is not limited to controllers employing such control laws or techniques, and it will be appreciated that sensorless pressure control and observation of melt pressure in association with other control laws are contemplated as falling within the scope of the present invention.

The model 180 comprises one or more differential equations representative of the behavior (e.g., static and dynamic) of the injection molding machine 102, or portions thereof, as illustrated and described in greater detail hereinafter with respect to FIGS. 9–12. In the exemplary control system 130, the control law 160 comprises one or more software objects or components in an object-oriented software system operating in the PC based hardware platform. The profile 170 and the current machine state 150 may be saved in a memory data store in the system 130 for access thereto and updating by external influences (e.g., via user interface 132) and/or by process related influences (e.g., via sensor input values). In addition, the profile and/or the current machine state may be operated on and/or otherwise accessed by various software objects in the control system 130 (e.g., such as the control law 160). Although the exemplary control system 130 is structured as an object-oriented software implementation, other implementations in hardware, software, and/or combinations thereof are contemplated as falling within the scope of the present invention.

Figure 6:
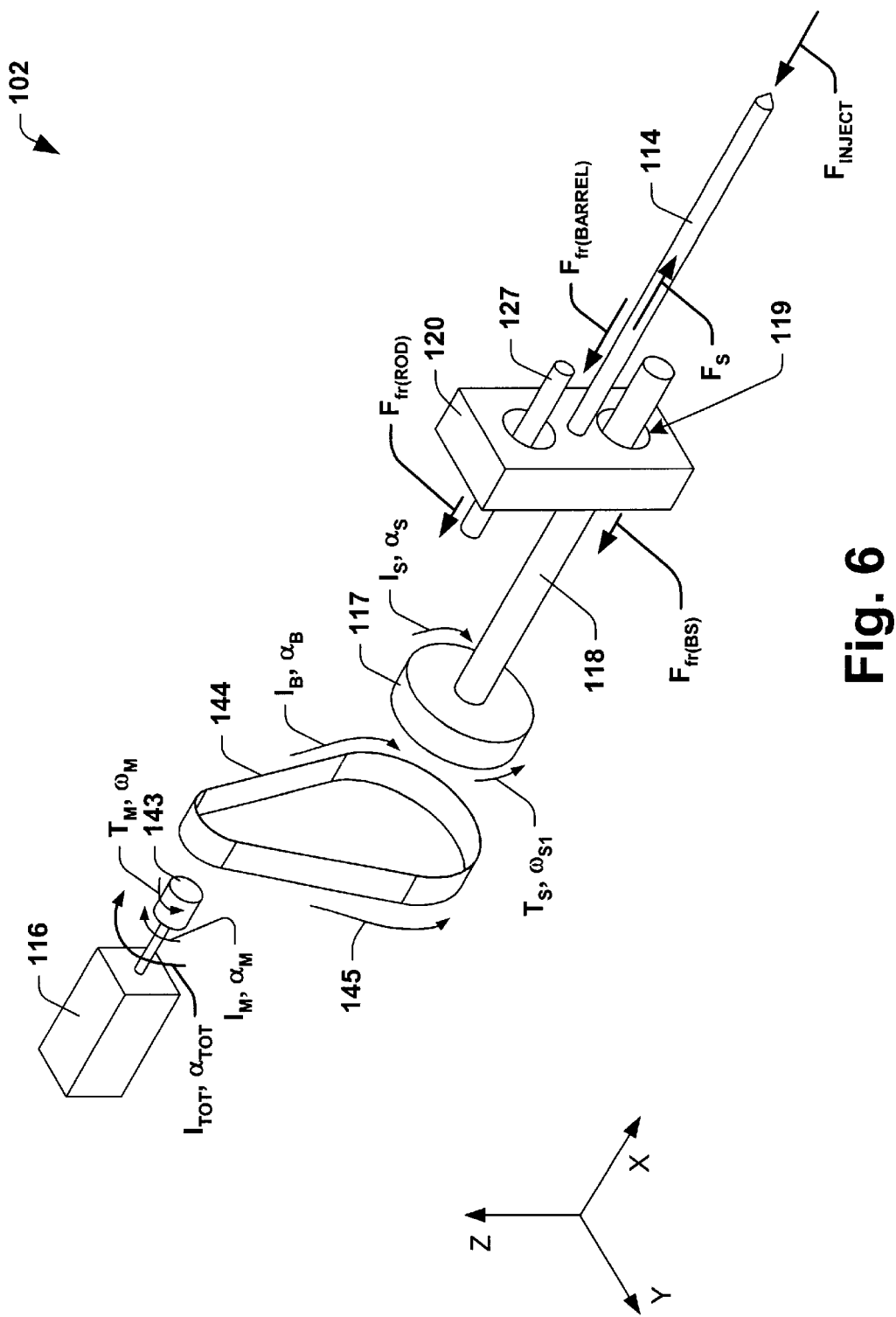
FIG. 6 is a simplified perspective view schematically illustrating the translational actuation components of the machine of FIGS. 2–5.

Referring also to FIG. 6, a simplified rendering of the linear translation components of the injection molding machine 102 is provided for illustrating several aspects of the present invention, in which the motor 116 comprises a drive pulley 143 rotated thereby in the indicated direction 145 to cause rotation of a pulley 117 via a belt 144, in order to translate the injection ram 114 in the forward or positive "X" direction during an injection step. The pulley 117 causes rotation of the ball screw 118, and hence translation of the brace member 120 with respect to the support rail 127 via the ball nut 119 (e.g., FIGS. 2–5) mounted in the member 120, which threadingly engages with the ball screw 118. The motor 116 sees a rotational loading torque from the translational components comprising a total inertia $I_{TOT}$ during motion and a rotational acceleration $\alpha_{TOT}$. The motor 116 itself and the pulley 143 contribute a portion of this loading, comprising an inertia $I_M$ and acceleration $\alpha_M$, alternatively quantified as a torque $T_M$ and angular velocity or speed $\omega_M$. The belt 144 contributes inertia $I_B$ and acceleration $\alpha_B$.

Likewise, the motor 116 experiences loading torque related to the ball screw 118 and pulley 117 comprising an inertia $I_S$ and acceleration $\alpha_S$, alternatively quantified as a torque $T_S$ and angular velocity or speed $\omega_S$, wherein the accelerations $\alpha_S$ and $\alpha_M$ (e.g., and the velocities $\omega_S$ and $\omega_M$) are related by the ratio of the diameters of the pulleys 117 and 143.

The ball screw 118 and ball nut 119 convert the rotational motions into longitudinal translation of the ram 114. However, the conversion involves frictional losses $F_{fr(BS)}$ associated with the interfacing of the ball screw 118 and the ball nut 119, as well as the friction $F_{fr(ROD)}$ between the brace member 120 and the support rod or rail 127. Additional friction force $F_{fr(BARREL)}$ results from the interface between the injection ram 114 and the interior of the barrel 115 (e.g., FIG. 2). Thus, the torque seen at the motor 116 is a result of these frictional forces and the force due to the pressure of the plasticized melt in the barrel 115 during an injection step (e.g., as well as during a pack or hold step). In this regard, the longitudinal force $F_S$ at the ram 114 resulting from the motor 116 during injection is opposed by the frictional forces $F_{fr(ROD)}$, $F_{fr(BARREL)}$, and $F_{fr(BS)}$, and the force $F_{INJECT}$ corresponding to the melt pressure. In accordance with an aspect of the invention, the melt pressure in the barrel 115 may be observed or estimated using an observer solving one or more state equations of a model, wherein the frictional forces are taken into account, and the motor torque and acceleration are ascertained either from the motor drive 116a or from external sensors. In this manner, the present invention facilitates control or monitoring of injection melt pressure without pressure sensors, strain gages, or load cells, and the various deficiencies associated therewith, as described above.

Although the illustration of FIG. 6 is a simplification of the actual operation of the translational components of the machine 102, the exemplary model 180 may be constructed so as to allow observation of one or more operational parameters (e.g., such as melt pressure) associated with the simplified illustration in FIG. 6, and may be employed to model an actual molding machine (e.g., machine 102), wherein the physical characteristics of the machine 102 are taken into account through selection of appropriate coefficients for state equations therein, as illustrated and described in greater detail hereinafter with respect to FIGS. 9–12. For example, the exemplary model 180 takes the various frictional and melt pressure forces illustrated in FIG. 6 into account through one or more state equations representative of behavior of the injection molding machine 102, and in particular of the translational components thereof. The forces or torque attributable to the dual belts around pulleys 117a and 117b (e.g., FIGS. 2–5) can be modeled via the single belt and pulley 117 of FIG. 6. Similarly, the dual ball screws 118 and ball nuts 119 (FIGS. 2–5) can be modeled as single components 118 and 119 (FIG. 6), and the multiple support rods or rails 127 (FIGS. 2–5) can be modeled as a single rod 127 (FIG. 6). In constructing the various equations of the model 180 corresponding to ram translation, the masses, inertias, friction coefficients, and other physical characteristics of the translational components can be obtained from a variety of sources, such as CAD models, manufacturer data sheets, and the like, and further more may be updated according to changes in physical conditions of a given machine, wear, temperature, degradation, or the like. Those skilled in the art will recognize that the modeling of the equations is keyed to the mechanical structure illustrated. Other mechanisms can be used to provide screw translation. The methodology illustrated for the preferred embodiment is followed. That is, the mechanical structure producing the motion is broken down to its elemental parts. These parts are then modeled for forces and friction.

Figure 7:
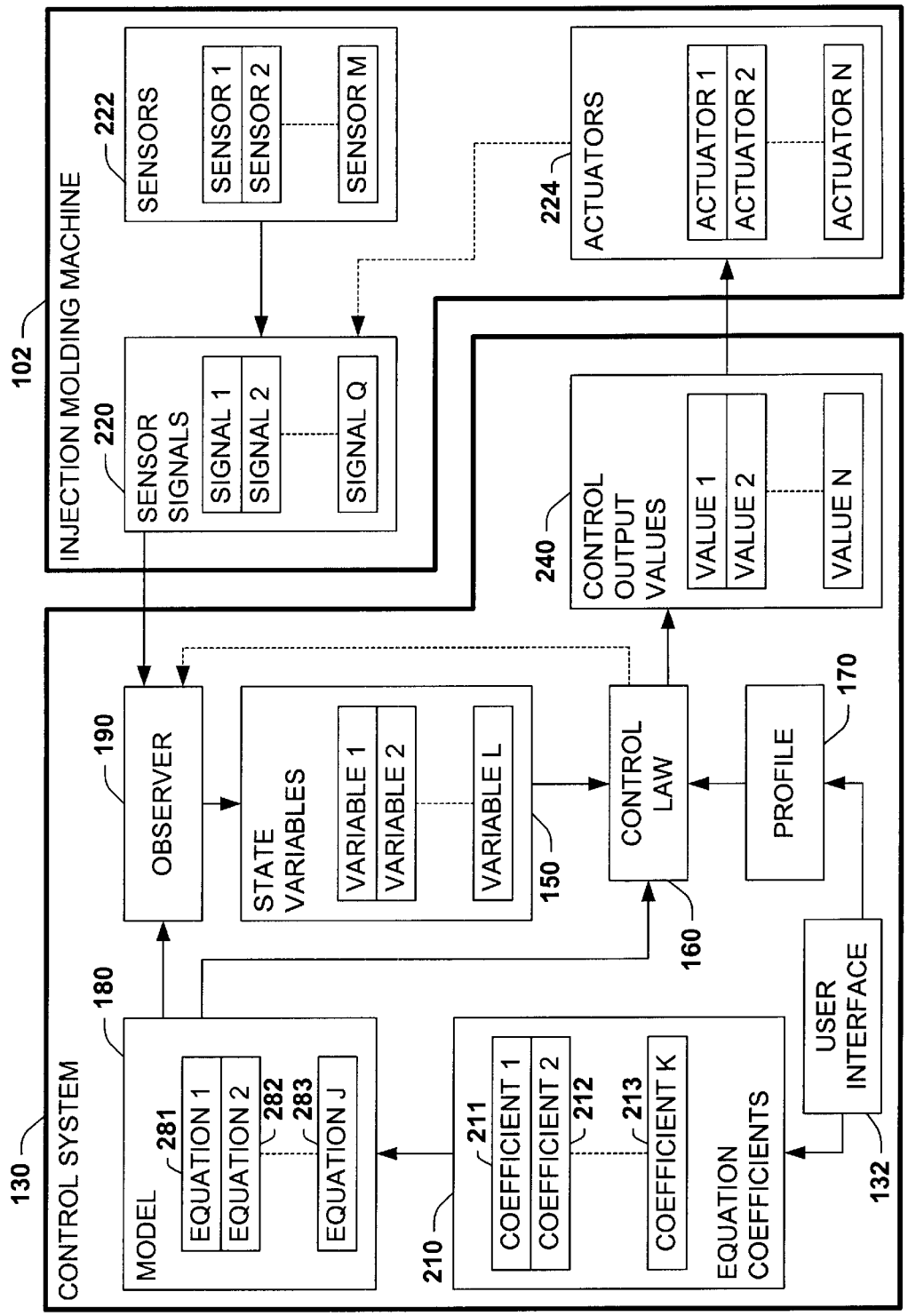
FIG. 7 is a schematic diagram further illustrating details of the control system of FIG. 2.
Figure 8A:
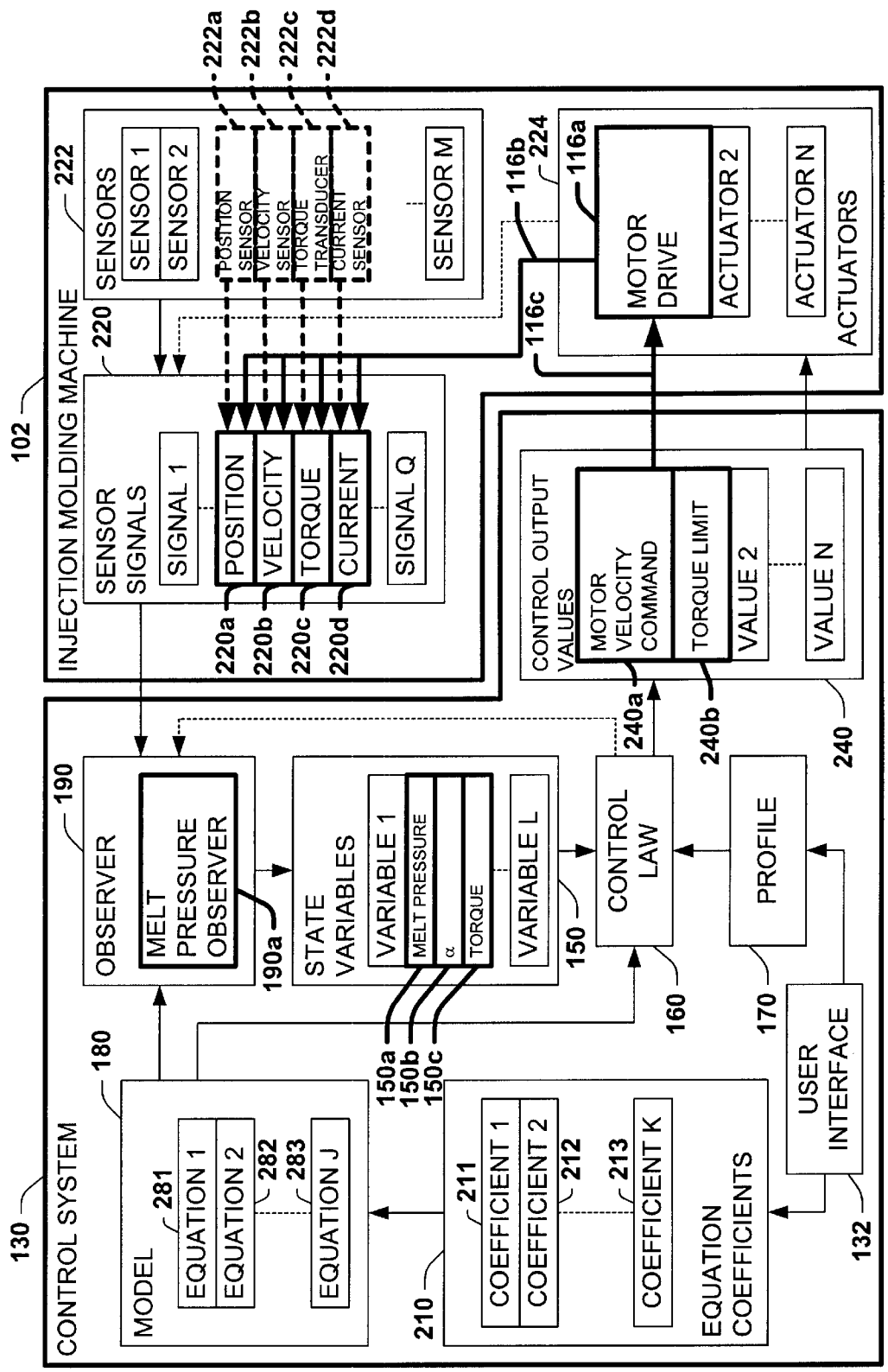
FIG. 8a is a schematic diagram further illustrating the control system of FIGS. 2 and 7.

Further details of the exemplary control system 130 are illustrated in FIGS. 7 and 8a, wherein the model 180 comprises an integer number "J" equations 281, 282, through 283, one or more of which may be differential equations. The equations 281, 282, through 283 of the model 180 represent various behavioral characteristics of the exemplary injection molding machine 102, using equation coefficients 210 specific to the machine 102, wherein individual coefficients 211, 212, through 213 may be provided via the user interfaced 132, and/or may be derived through other means. Coefficients 210, for example, may represent physical characteristics of the machine 102 or components thereof, such as mass, inertia, coefficients of friction, orifice sizes, or other physical properties. In particular, it will be appreciated that the various inertias of the translational components of the machine 102 may be derived from CAD models thereof, where the masses are derived from the materials used in their construction. Similarly, coefficients of friction associated with the various friction forces $F_{fr(ROD)}$, $F_{fr(BARREL)}$, and $F_{fr(BS)}$, may be included as coefficients 210 in the control system 130 for use by the observer 190 in solving one or more state equations of the model 180. Furthermore, parameters associated with the translational motor 116 may likewise be incorporated in the model 180 via appropriate equations, coefficients 210, and/or lookup tables, as illustrated and described further hereinafter.

The values of the coefficients 210, moreover, may be estimated for a given machine, and/or may be derived using a parameter identification procedure. For instance, a known series of commands or control output values 240 may be output from the control system 130 to the machine 102 in an off-line situation, and the various sensor input values 220 can be recorded. For instance, forces may be ascertained by running two test translations (e.g., with no melt load) of the ram 114, at two different accelerations. Where the accelerations are derived from position or velocity measurements (e.g., through differentiation), and the masses are assumed to be constant, the resulting forces can be obtained for use in the model 180. A cost function, for example, an integrated absolute error function may then be employed to determine the difference between an expected reaction of the model 180 (e.g., using the known values 240 and a particular set of coefficients 210), and the actual (e.g., measured) machine response. The cost function provides a metric or value indicative of how well the current coefficients 210 correlate with the actual measured response, and a minimization rule can then be employed so as to adjust the coefficients 210 to better match the machine 102.

In the exemplary implementation, the coefficients 210 and the model equations 281–283 are stored in a data store in the memory of the control system 130, whereby access thereto by various software or hardware components in the control system 130 is facilitated. In particular, the model 180 may be accessed by the observer 190 in order to provide the current machine state 150 and by the control law 160 in order to simulate estimated future machine states by solving some or all of the equations 281–283 using the current state 150 and an estimated set or vector of control output values. Other implementations are possible within the scope of the present invention, for example, such as wherein the coefficients 210, the model 180, and/or the profile 170 (e.g., or portions thereof are stored in a remote data store, and are accessed as needed by the control system 130, for example, via networks or other communications media, including global communications networks such as the Internet.

In accordance with the invention, the exemplary observer 190, and the melt pressure observer component 190a thereof, may access the model 180 in order to provide the current machine state variables 150, including a melt pressure value 150a. The observer 190 inputs an integer number "Q" of sensor input signals 220 derived from various sensors 222 and/or from actuators 224 in the machine 102, and provides the current state variables 150 in the form of a current state vector comprising one or more values, which is in turn used by the control law 160 in determining an integer number "N" control output values in the form of a control output vector 240. The control output values 240 are then provided to actuators 224 in the machine 102 so as to effect a desired operation thereof. For instance, in addition to controlling various other motions or pressures in the machine 102, the control law 160 may provide a control output value in order to operate the motor 116 to effectuate a desired ram velocity or position, and/or to achieve a desired melt pressure during injection. In this fashion, the control system 130 controls the motions of one or more components in the machine 102.

Referring also to FIG. 8a, the observer 190 comprises a melt pressure observer component 190a and the machine state 150 comprises melt pressure, angular acceleration ($\alpha$) and torque variables 150a, 150b, and 150c related to the injection unit 110 of the machine 102, wherein the acceleration (e.g., $\alpha$) and torque values 150b and 150c are indicative of the acceleration and torque at the drive motor 116. The observer 190 may be implemented in software as a class, with a melt pressure observer object 190a being an instance thereof. Other implementations are possible within the scope of the present invention wherein, for example, the melt pressure observer 190a may be implemented in any form of software, hardware, and/or combinations thereof. The control output values 240 include a motor velocity (e.g., and/or position) command value 240a, and optionally a torque limit value 240b, which are updated by the control law 160 each control cycle or period (e.g., 1 ms) and provided to the motor drive actuator 116a in the form of a control signal 116c. Where the drive 116a and control system 130 communicate digitally, the values 240a and 240b may alternatively be provided to the drive 116a in digital form, for example, via a serial or parallel data interface (not shown). The observer 190 and the melt pressure observer component 190a receive a first input value representative of motor velocity or motor position and a second input value representative of motor current or motor torque from the injection molding machine 102, in the form of sensor signals 220 derived from sensors in the machine 102, or directly from actuators 224, such as the motor drive 116a. For instance, a position value 220a may be provided alternatively from a position sensor 222a (e.g., such as sensor 135 of FIG. 2) or from the motor drive 16a. Likewise velocity, torque, and current values 220b, 220c, and 220d, may alternatively be obtained from velocity, torque, and current sensors 222b, 222c, and 222d, respectively, or from the drive 116a. As stated above, the drive 116a may alternatively provide one or more of these input values to the observer 190 in the control system 130 via digital communications. The melt pressure observer 190a then provides the current melt pressure value 150a (e.g., and the acceleration and torque values 150b and 150c) according to one or both of the first and second input values using the model 180. The control law 160 may then operate to control the ram injection according to the observed melt pressure value 150a without directly sensing pressure, strain, or forces associated therewith. Alternatively, the control law 160 may provide the output values 240 to achieve a desired velocity, while the melt pressure value 150a is monitored, for example, by rendering the value 150a to a machine operator via the user interface 132.

Figure 8B:
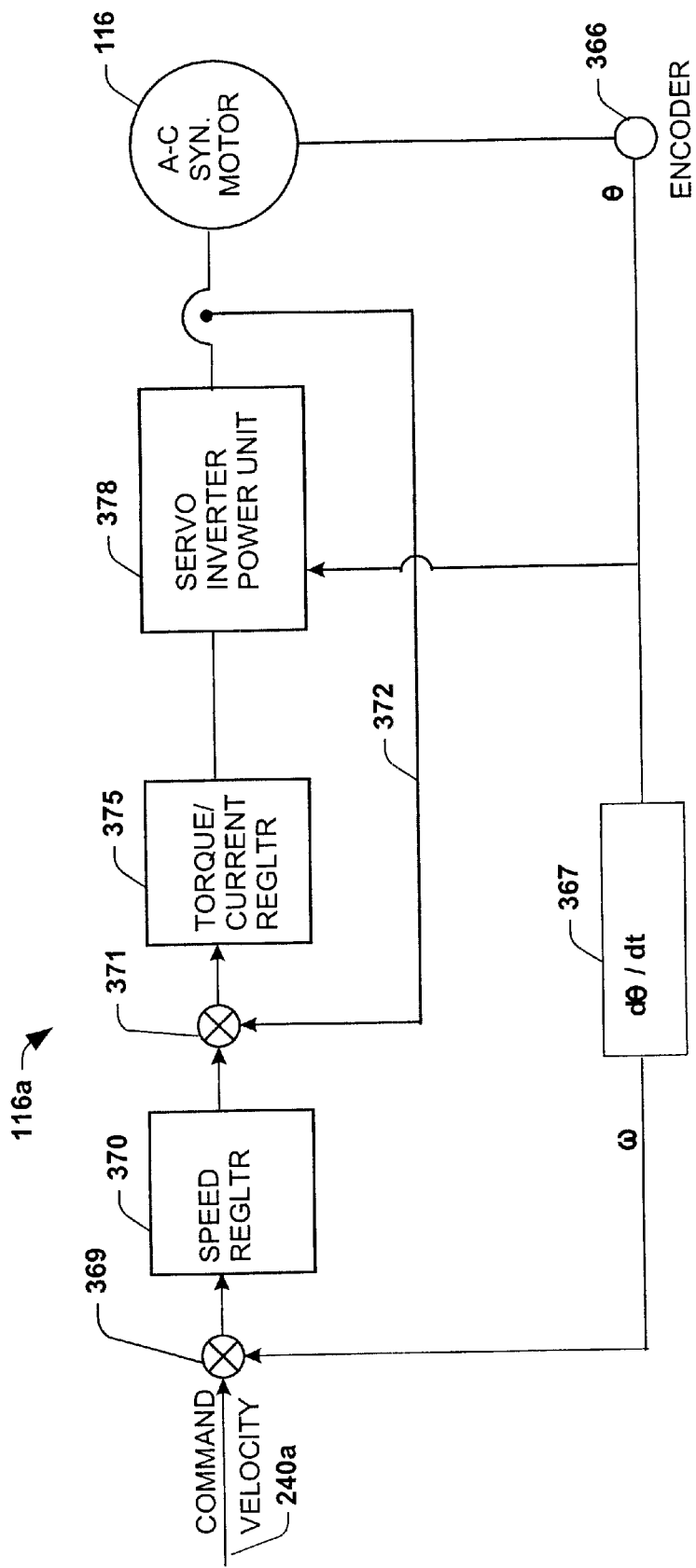
FIG. 8b is a schematic representation of a motor drive.

It is to be appreciated that any of the motors illustrated in FIG. 8a can be of any known type, i.e., ac synchronous, induction, dc brushless, even DC brush motors. In all instances, the motor will have a drive containing circuitry that controls its operation pursuant to a command signal issued by the machine's control system. Referring to FIG. 8b, general details of a general representation of motor drive 116a is illustrated, in which a pulse tachometer or encoder 366 generates a rotor position and through a derivative block 367 provides a motor speed feedback. The motor speed feedback is summed at 369 with a velocity or speed command signal 240a generated by the control law 160 in FIG. 8a. The error signal then passes through a velocity regulator block 370 containing algorithms producing a velocity based motor drive signal. The velocity based motor drive signal is then summed at 371 with a current signal extracted from the current inputted to AC motor 116 on line 372 to produce either a torque current signal or a torque limited current signal. Generally speaking, in one implementation of the invention the control system will utilize torque control for velocity command and torque limit control for pressure control. The error signal producing at summing junction 370 then passes through a torque regulator 375 containing algorithms producing the final drive signal. The final drive signal is then synchronized with the rotor position vis-a-vis encoder 366 and converted into appropriate trigger signals in servo inverter power unit 378 generating the current inputted to AC motor 116. Those skilled in the art will readily understand that the drive illustrated in FIG. 8b is a very simple, generic illustration of a typical drive, but one which has been used to implement the invention in an AC synchronous motor. One of the reasons for illustrating the drive is to simply show that while the command signal is a speed signal, that signal is further refined by the drive to produce, in the preferred implementation of the invention, either a torque or torque limiting signal to the motor. The invention is not limited to any specific drive.

Figure 9:
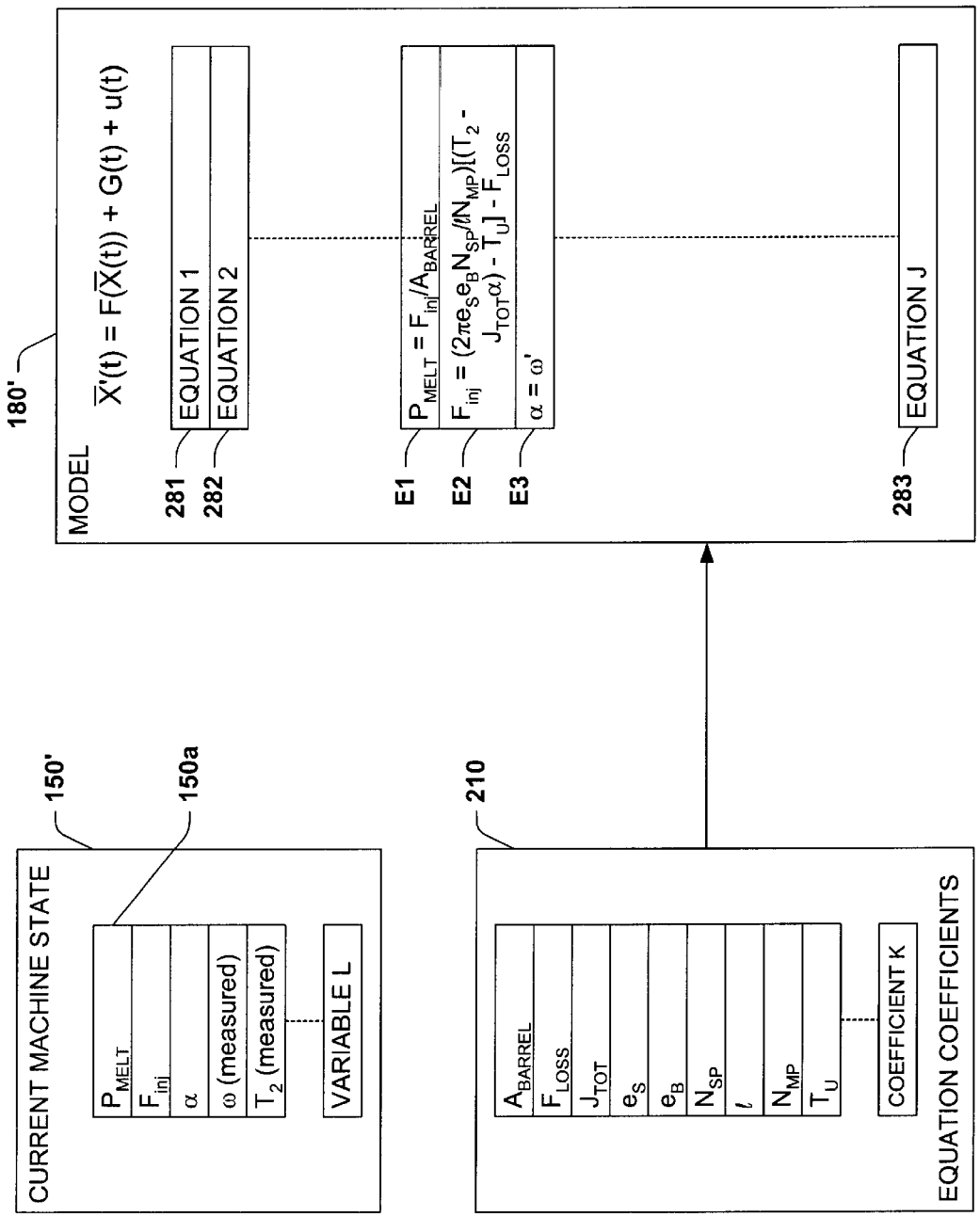
FIG. 9 is a schematic diagram illustrating one exemplary implementation of a model and a current machine state where velocity and torque are measured in accordance with the invention.

Referring also to FIGS. 9–12, the invention may be implemented in a variety of forms, wherein the current machine state 150 and the equations of the model 180 are provided according to the availability of motor position, speed, torque, and/or current information. A first case is illustrated in FIG. 9, wherein motor speed and torque are obtained from the first and second input values, respectively. The machine state 150' of FIG. 9 comprises melt pressure, injection force, motor acceleration, motor speed, and motor torque values, and the model 180' comprises three equations E1, E2, and E3 used by the observer 190a to provide a melt pressure value $P_{MELT}$ 150a. The state equation E1 comprises a melt pressure equation, which is a function of motor acceleration $\alpha$ and motor torque, together with an injection force equation E2. The melt pressure observer 190a solves the melt pressure equation E1 using the first and second input values to provide the current melt pressure value 150a.

In the example of FIG. 9, the first input value is indicative of motor velocity and the model 180' comprises a motor acceleration equation E3, which is a function of motor velocity $\omega$. The observer 190 may solve the differential equation E3 using a variety of numerical techniques, such as difference equations, or digital filters using Hamming windows, or the like. The melt pressure observer 190a solves the motor acceleration equation E3 using the first input value to provide a motor acceleration value $\alpha$, and solves the melt pressure equation E1 using the motor acceleration value α and the second input value (e.g., motor torque) to provide the current melt pressure value 150a. In this regard, an injection force equation E2 may first be solved using the acceleration a and the measured torque $T_2$, and then the melt pressure equation E1 can be solved by dividing the injection force $F_{inj}$ by the barrel area $A_{BARREL}$. Alternatively, the equations E1 and E2 may be expressed as a single melt pressure equation (not shown) which is a function of motor acceleration α and torque information. The illustrated injection pressure equation E2 for $F_{inj}$ is a function of acceleration α and motor torque $T_2$, as well as coefficients 210 for loss forces $F_{LOSS}$ (e.g., frictional forces $F_{fr(BARREL)}$ and $F_{fr(BS}$ of FIG. 6), inertia $J_{TOT}$, ballscrew and belt efficiencies $e_S$ and $e_B$, respectively, the diameter ratio $N_{SP}/N_{MP}$ of the ball screw and motor translational pulleys, the ballscrew lead ꟈ(e.g., 1/ballscrew pitch), and the support bearing frictional torque $T_U$ associated with the frictional force $F_{fr(ROD)}$ of the support rails 127 (e.g., FIG. 2). The exemplary model equations E1 and E2 of the illustrated implementation are but one example within the scope of the present invention, which further contemplates other implementations and melt pressure equations beyond those specifically illustrated and described herein.

Figure 10:
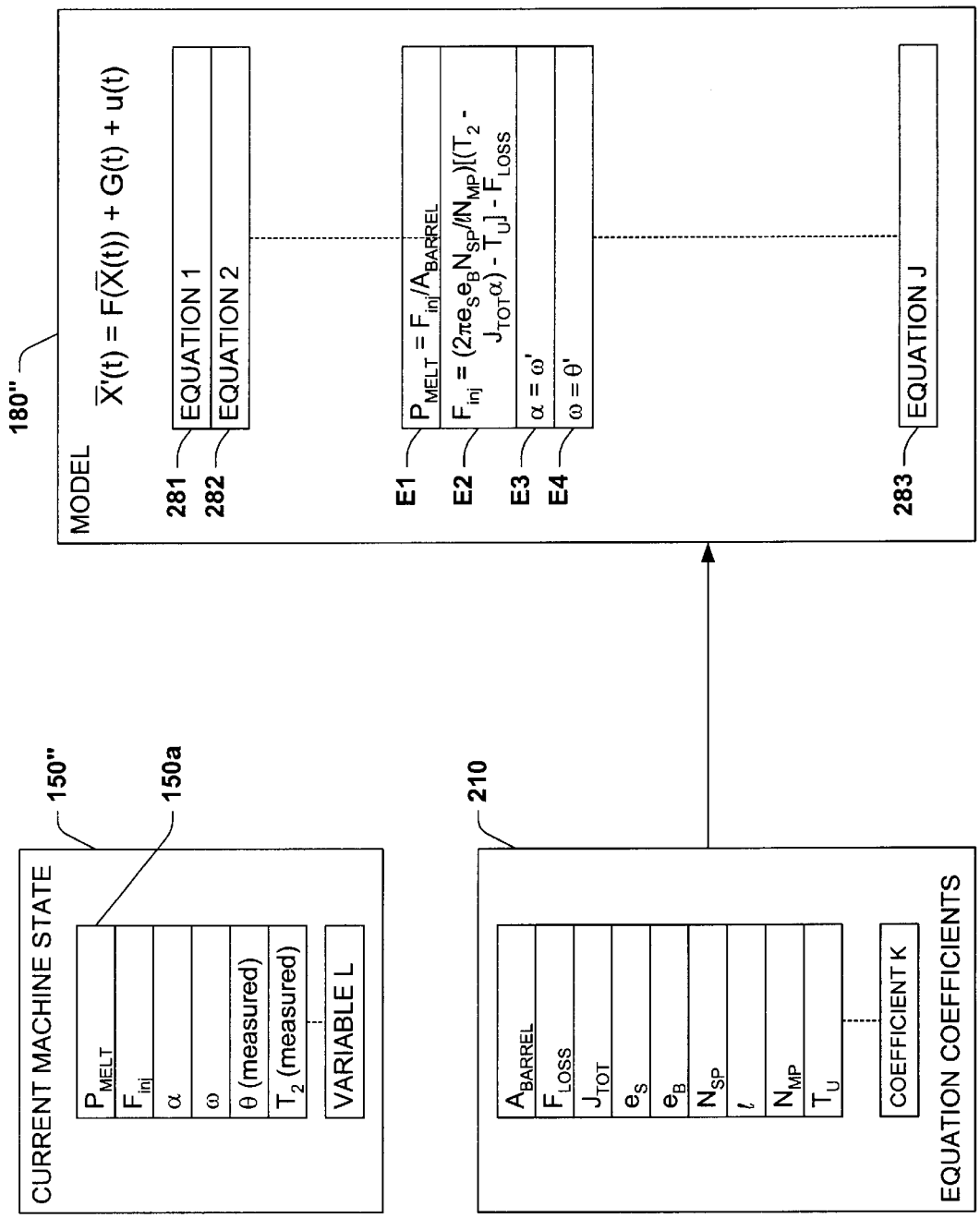
FIG. 10 is a schematic diagram illustrating another implementation of a model and a current machine state where position and torque are measured in accordance with the invention.
Figure 11A:
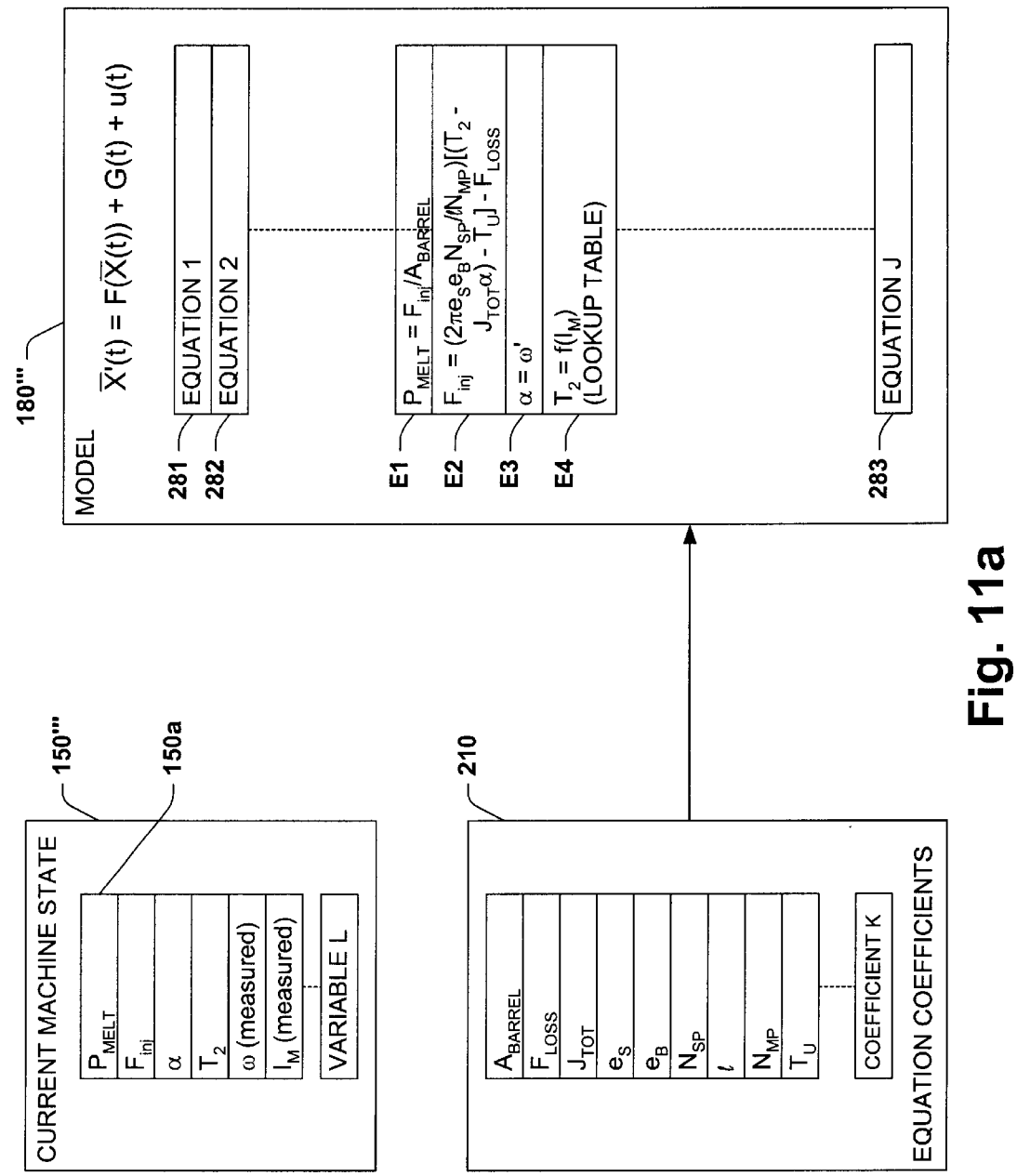
FIG. 11a is a schematic diagram illustrating another implementation of a model and a current machine state where velocity and current are measured and torque is derived from current using a lookup table in accordance with the invention.
Figure 11B:
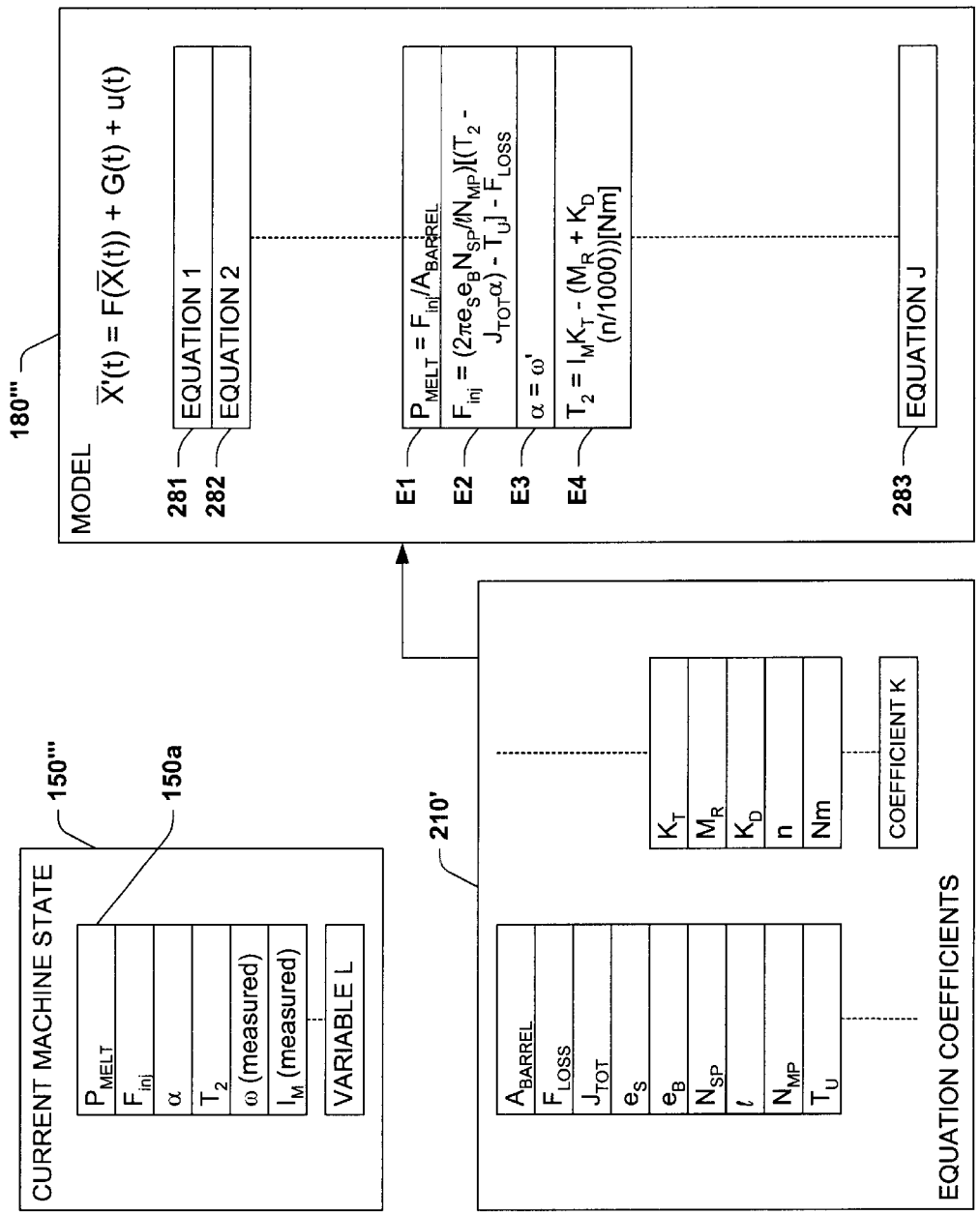
FIG. 11b is a schematic diagram illustrating another implementation of a model and a current machine state where velocity and current are measured and torque is derived from current using a state equation in accordance with the invention.

In FIG. 10, a motor position θ is measured along with the torque $T_2$. An equation E4 in the model 180" is solved for the velocity ω, and equation E3 is solved for the acceleration α, which is then used to solve for the injection force $F_{inj}$ and ultimately the melt pressure 150a using equations E2 and E1. Another example is illustrated in FIG. 11a, wherein angular motor velocity ω and motor current $I_M$ are measured. The motor torque $T_2$ is solved by the melt pressure observer 190a using a lookup table, for example, such as may be obtained from motor manufacturer's specifications for the motor 116, and which is a function of motor current $I_M$. The angular acceleration α is derived from the velocity ω, and the acceleration α and motor torque $T_2$ are used to solve for the melt pressure 150a using equations E2 and E1. A similar alternative is illustrated in FIG. 11b, wherein the motor torque $T_2$ is expressed as a function of current $I_M$ in an equation E4, and wherein the coefficients 210' include constants associated with the motor/torque relationship for the motor 116.

Figure 12:
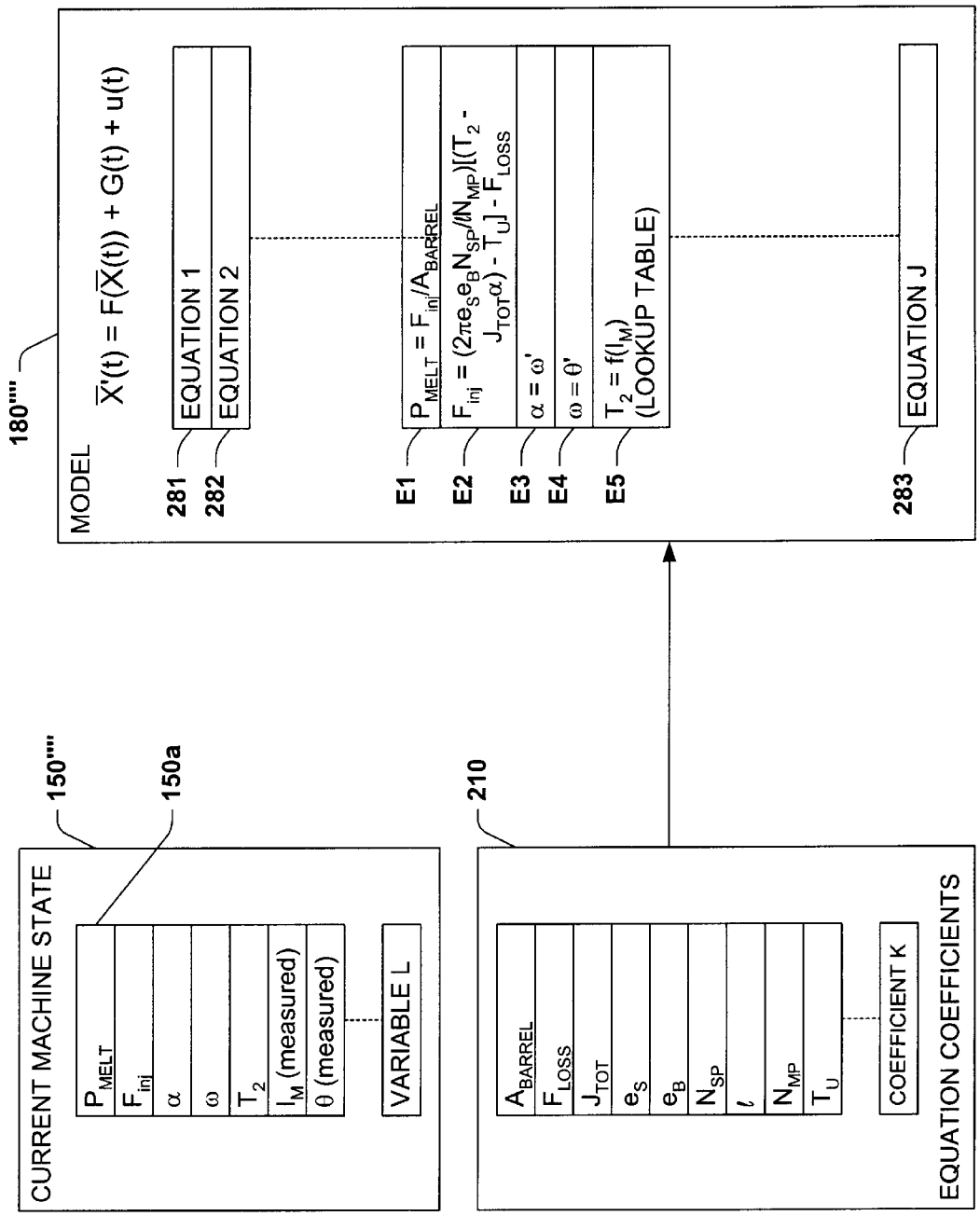
FIG. 12 is a schematic diagram illustrating another implementation of a model and a current machine state where position and current are measured in accordance with the invention.

Yet another possible implementation is illustrated in FIG. 12, wherein motor current $I_M$ and angular position θ are measured. The melt pressure observer 190a converts the position θ into acceleration α via equations E4 and E3, and the motor torque $T_2$ is derived from a lookup table (e.g., or through an equation as illustrated in FIG. 11b) using the measured motor current $I_M$. Thereafter, the melt pressure 150a is solved by the observer 190a using equations E2 and E1. Other implementations are possible within the scope of the present invention, apart from the models, coefficients, and observers illustrated herein. Furthermore, the melt pressure may be modeled as a function of variables other than position, velocity, current, and/or torque within the scope of the invention, by which melt pressure may be derived without pressure sensing in the molding machine 102. It is further noted at this point, that where the first and second input values (e.g., position or velocity, and current or torque) are obtained directly from the motor drive 116a, the invention may be employed for sensorless estimation of a melt pressure in an injection molding machine, via the provision of the observer 190 and the model 180. Furthermore, sensorless operation can be employed where an existing sensor has failed or is out of calibration, without the down-time associated with repair and calibration thereof. Moreover, the observed melt pressure value 150a does not include frictional and other force effects, as would be present in the signal from conventional pressure transducers. Thus, the invention provides significant cost and accuracy advantages over conventional techniques for monitoring and/or controlling injection molding machine melt pressures.

As illustrated and described above with respect to FIGS. 7 and 8a, the exemplary control system 130 comprises a recursive model predictive type control law 160. However, it will be appreciated that the observer 190 and model 180 of the present invention may be advantageously employed in many different control and/or monitoring applications. In this regard, the invention finds utility in association with any type of control law, such as PID controls, or others. In the exemplary implementation illustrated and described above, the recursive model predictive control law 160 is employed, by which further advances over conventional molding machine controls can be achieved.

Referring now to FIG. 13, further details of the exemplary control law 160 in the control system 130 are illustrated and described hereinafter. The control law 130 estimates future machine states according to a proposed control output vector 263, the current machine state 150, and the model 180 of the machine 102, and recursively refines the control output vector 263 using an error function and an adjustment rule 268 in order to reduce the error between the estimated future machine states and desired future machine states R(s) 267, such as from a velocity or pressure profile 170. The current machine state 150 is provided by the observer 190 using the model 180 and current machine sensor signals, by which the number of required sensors can be reduced. For instance, as described above, the melt pressure observer component 190a of the observer 190 provides a current melt pressure value 150a (e.g., FIG. 8a) in the current machine state 150 using the model 180. One or more control outputs 240 are then provided to actuators 224 (e.g., such as to the motor drive 116a) associated with the machine 102 according to the refined proposed control output vector 263 from the control law 160.

The simulator component 261 in the exemplary control system 130 is a software component or object running on the hardware platform of system 130, which operates to simulate a plurality of estimated future states 262 of the injection molding machine 102 according to a proposed control output vector 263 having a plurality of control output values representative of control outputs 240 at a current time and at future times using the current state vector $X(t_0)$ 264 from the current machine state 150 and the model 180. For example, one of the control output values in the motor velocity command value 240a provided to the motor drive 116a. The simulator 261 is operative to solve the state equations of the model 180 using the proposed control output vector 263 and the current state vector 150. For instance, the exemplary simulator component 261 of the control law 160 employs one or more numerical techniques, such as a Runge-Kutta method or difference equation techniques, in order to solve the equations 265 from the model 180, to simulate the estimated future states 262. In this regard, the melt pressure observer component 190a of the observer 190 may also use such techniques in solving one or more of the model equations in providing the melt pressure value 150a.

The control law 160 further comprises a cost or error function evaluator 266 operative to determine an error E between the estimated future states 262 and the desired future states R(s) 267 from the user-defined profile 170. In the illustrated example, the profile 170 comprises a pressure versus time profile for the longitudinal translation of the ram 114, and the desired future states R(s) 267 may be derived therefrom. The error E thus is indicative of the appropriateness of the proposed control output vector u(t) 263 initially provided by the control law 160. The initial proposed control output vector u(t) 263 may be derived from a final (e.g., refined) control output vector from a previous control cycle, whereby the error E may be reduced and the recursive control output refinement of the control law 160 may be enhanced.

The control law 160 also comprises an adjustment rule 268 operative to adjust or refine the proposed control output vector 263 according to the error E, a control output function u(t)=h($\phi$,t), shown as a control output parameter translator 169, wherein the adjustment rule 268 generates or correlates a plurality of coefficients $\phi_i$ 270 from the proposed control output vector 263 according to the control output function u(t)=h($\phi$,t), and evaluates a plurality of partial differential equations [$\partial E/\partial \phi_i$] for error with respect to the plurality of coefficients $\phi_i$. Other implementations of adjustment rules are possible, for example, wherein a single refinement of the proposed control output vector is accomplished by an adjustment rule 268 which performs an inverse operation to obtain a refined control output vector, which can then be provided as the current control output u(t) 240, particularly where the machine 102 (e.g., or the subsystem thereof being controlled) is somewhat linear.

In the exemplary implementation illustrated herein, u(t)=h($\phi$,t) is a function which provides an output value u(t) for any given time t, based on eight parameters $\phi_i$ forming a vector $\phi$. The eight parameters $\phi_i$ are the coordinates of four pairs of points of u(t) at t, wherein the value of u(t) between any of the pairs of points is a linear interpolation between the points. Thus, the eight values for $\phi$ may be used to represent 250 values of u(t), wherein less computational resources are needed for minimization of the error E. The coefficients $\phi_i$ are adjusted using numerical techniques so as to reduce the error E in the control law 160, wherein the control output parameter translator 269 thereafter translates the adjusted coefficients $\phi_i$ according to the control output function u(t)=h($\phi$,t) to provide the refined proposed control output vector u(t) 263. For example, one implementation of the exemplary control law 160 employs a conjugate gradient technique to adjust the values of the coefficients $\phi$, although other techniques can be employed within the scope of the invention, for example, such as variable metric optimizations, or the like.

In the illustrated exemplary control system 130, the control law 160 recursively refines the proposed control output vector 263 using the adjustment rule 268, to simulate refined estimated future states 263 using the simulator 261, and determines a refined error E between the refined estimated future states 262 and the desired future states R(s) 267 until a termination condition occurs. For example, the exemplary control law 160 ends the refinement process when either a predetermined time elapses (e.g., so as to ensure output of a control output vector to the machine 102 before the end of the current control cycle), a predetermined number of iterations occurs (e.g., so as to avoid endless loops), until the most recently refined error E is found to be less than a predetermined threshold value, or until the rate of change of the error E is less than a threshold.

Once one of these termination conditions is met, the control law 160 provides a control output u($t_0$) 240 to the actuators 224 (FIG. 8a) in the injection molding machine 102 according to the most recently refined proposed control output vector 263. In this regard, the proposed control output vector may comprise an array or matrix of control output vectors, wherein each column vector comprises a plurality of control output values 240 individually destined for a particular actuator 224 in the machine 102, and wherein each row of such vector represents the estimated control output values at a given time. Thus, individual control output vectors in such an array 263 may be provided for a number of control cycles from the current time $t_0$ through a time window (e.g., or horizon) of a number of control cycles, such as 250. As indicated above, the control law 160 may save at least a portion of the most recently refined proposed control output vector 263 (e.g., the 249 future time proposed control output vectors of the array of 250 such vectors) for use in future control cycles as an initial estimate. For instance, in a subsequent control cycle, the control law 160 may provide a first proposed control output vector 263 as an initial "seed" according to a previously saved proposed control output vector 263 from a previous control cycle for the recursive refinement process of the invention. Alternatively, the smaller set of coefficients $\phi_i$, or a portion thereof, may be saved for use in subsequent control cycles, rather than saving the larger set of u(t) values (e.g., or a portion thereof).

The invention further contemplates methods for estimating or providing melt pressure values associated with longitudinal translation of an injection ram without pressure sensors, which may be implemented in any molding machine having an electric motor actuator, including but not limited to the exemplary injection molding machines illustrated and described herein. The melt pressure value is derived through obtaining a first input value indicative of a velocity or a position associated with an electric motor, as well as a second input value indicative of a current or a torque associated therewith. One or more state equations are then solved, such as found in the exemplary model 180, which represent behavior of an injection molding machine, in order to provide a current melt pressure value according to the first and second input values. The first and second input values can be obtained from any appropriate source, such as sensors or actuators associated with the molding machine. For instance, the values can be obtained from a motor drive which powers a translational electric motor actuator, whereby no additional sensors are needed for pressure control or monitoring in the machine. Once the melt pressure is sensed the machine can be controlled in a somewhat conventional manner. That is, for pressure profiling, the operator can set desired pressures at desired set travel points. The machine's controller will then compare set point data to sensed data (and in accordance with predictive modeling concepts, model expected pressures at travel distances not reached) to generate an error signal inputted to the drive as a command signal. The circuitry or processor in the motor's drive will adjust the torque, or alternatively, torque limit of the drive to control the ram's speed and melt pressure. When the hold condition is reached, the machine's control system language directly controls the ram position and the sensed melt pressure is used to generate an error signal against a preset pack pressure. The error signal is then used to transition to the preset back pressure as the melt solidifies to a torque limit set by the drive. The torque limit error signal is fed as a velocity command to the drive which is in a torque limit mold. By using actual pressure to generate the drive command signal, screw rebound is alleviated during changeover from inject to pact. The invention also contemplates computer-readable media having computer-executable instructions for estimating melt pressure in electric molding machines.

Figure 14:
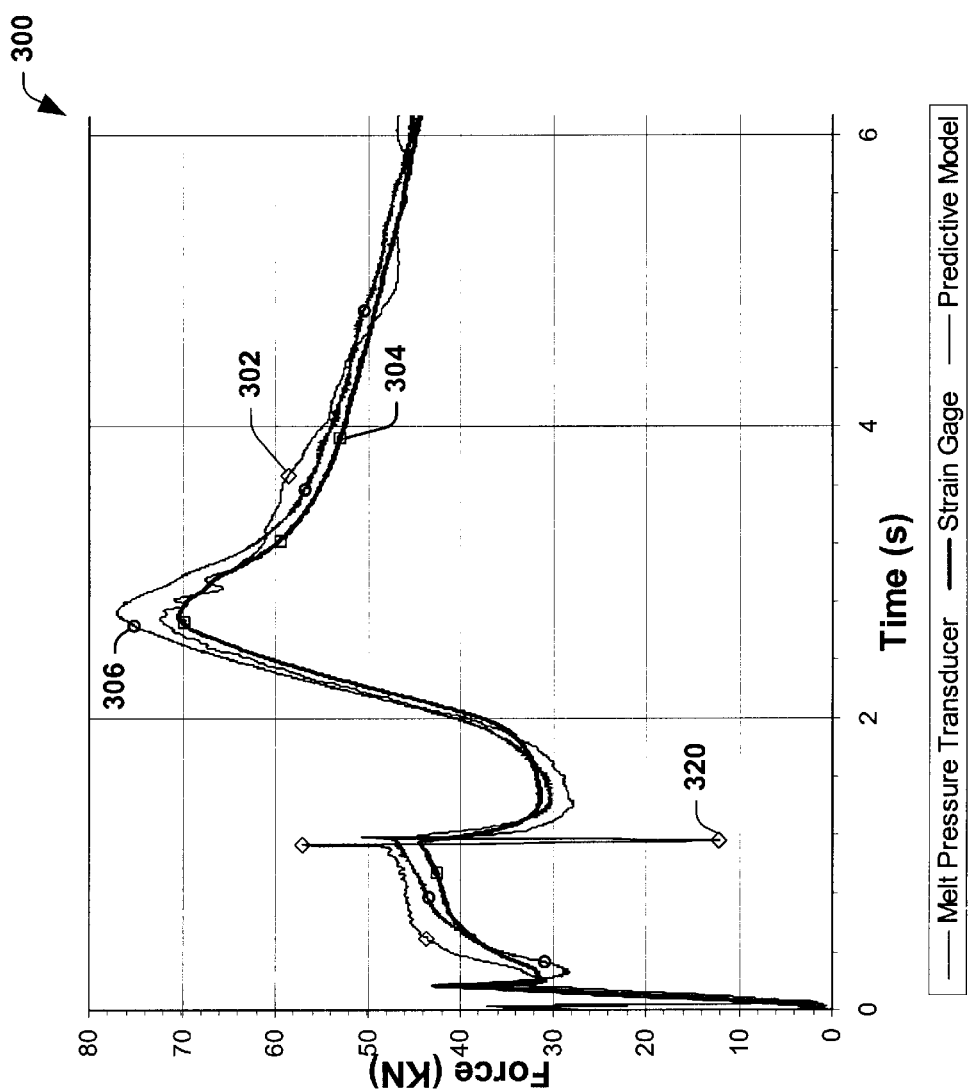

FIG. 14 illustrates a graph 300 of Force versus time showing performance of an exemplary melt pressure observer component (e.g., component 190a) in accordance with the present invention. A trace 302 passing through diamonds illustrates the observed injection force (e.g., related to the observed melt pressure value 150a by the barrel area $A_{BARREL}$). Also illustrated is trace 304 passing through squares indicative of strain gage measurements and trace 306 passing through circles obtained from melt pressure transducer measurements. As can be seen from the graph 300, the melt pressure observation aspects of the present invention provide sensorless operation for melt pressure control and/or monitoring in injection molding machines, by which equivalent or improved indication of the actual melt pressure can be obtained.

The strain gases were mounted on the center of the pusher plate and should produce an accurate signal. Note the differences between the plots of the strain gage and melt transducer. One would not expect the differences. Note the drop indicated by reference numeral 320 which occurs in trace 302 of the inventive system. This is not an artifact. When the ram changes from velocity to pressure control, there is an initial compression of the melt in the barrel followed by a very rapid drop as the velocity is suddenly changed followed by a more gradual pressure drop as the melt starts to fill the mold. The inventive system has sensitivity to discern the drop. The direct measurement probes do not. Moreover, as pointed out above, the invention accounts for frictional and other forces in the ram injection components, which cannot be extracted from the strain gage and transducer measurements 304 and 306.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description and the claims, such terms are intended to be inclusive in a manner similar to the term "comprising."

Having thus defined the invention, it is claimed:

1. A method for estimating a melt pressure associated with longitudinal translation of an injection ram in an injection molding machine having an electric motor, the method comprising:
    obtaining a first input value indicative of one of a velocity and a position associated with said electric motor;
    obtaining a second input value indicative of one of a current and a torque associated with said electric motor; and
    solving at least one state equation indicative of the force exerted on the melt from translational movement of said ram to provide a current melt pressure value according to said first and second input values.

2. The method of claim 1, further comprising providing a control signal to a motor drive associated with said electric motor according to a current machine state so as to achieve a desired translation of said injection ram in a controlled fashion, wherein said current machine state comprises said current melt pressure value, and wherein said control signal is provided according to said current melt pressure value for sensorless pressure control.

3. The method of claim 1, wherein obtaining said first input value comprises obtaining a first sensor value from one of a velocity sensor and a position sensor associated with said injection molding machine, and wherein obtaining said second input value comprises obtaining a second input value indicative of one of an electrical current and a torque associated with said electric motor from said motor drive.

4. The method of claim 1, wherein said at least one state equation comprises a melt pressure equation, which is a function of motor acceleration and motor torque, and wherein solving at least one state equation comprises solving said melt pressure equation using said first and second input values to provide said current melt pressure value.

5. The method of claim 4, wherein said first input value is indicative of a motor velocity, wherein said at least one state equation comprises a motor acceleration equation, which is a function of motor velocity, and wherein solving at least one state equation comprises solving said motor acceleration equation using said first input value to provide a motor acceleration value and solving said melt pressure equation using said motor acceleration value and said second input value to provide said current melt pressure value.

6. The method of claim 4, wherein said first input value is indicative of a motor position, wherein said at least one state equation comprises a motor velocity equation, which is a function of motor position and a motor acceleration equation, which is a function of motor velocity, and wherein solving at least one state equation comprises solving said motor velocity equation using said first input value to provide a motor velocity value, solving said motor acceleration equation using said motor velocity value to provide a motor acceleration value, and solving said melt pressure equation using said motor acceleration value and said second input value to provide said current melt pressure value.

7. The method of claim 4, wherein said second input value is indicative of motor torque, and wherein solving at least one state equation comprises solving said melt pressure equation using said first and second input values to provide said current melt pressure value.

8. The method of claim 4, wherein said second input value is indicative of motor current, wherein said at least one state equation comprises a motor torque equation, which is a function of motor current, and wherein solving at least one state equation comprises solving said motor torque equation using said second input value to provide a motor torque value and solving said melt pressure equation using said first input value and said motor torque value to provide said current melt pressure value.

9. The method of claim 4, wherein said second input value is indicative of motor current, further comprising providing a lookup table having values correlating current and torque for said electric motor, and wherein solving at least one state equation comprises obtaining a motor torque value from said lookup table using said second input value and solving said melt pressure equation using said first input value and said motor torque value to provide said current melt pressure value.

10. The method of claim 1 further including the step of solving said at least one state equation by determining the current effects of inertia and friction on the mechanical transmission components of said ram.

11. A method for controlling longitudinal translation of an injection ram in an injection molding machine during injection by ram pressure, said ram moved by an electric motor the method comprising:
   obtaining a first input value indicative of one of a velocity and a position and an acceleration associated with said electric motor;
   obtaining a second input value indicative of one of a current and a torque associated with said electric motor;
   determining sensed melt pressure from said first and second input valves correlated to a present position of said ram; and,
   generating a command signal to said motor as a result of the difference between said sensed melt pressure and a set pressure at said present position.

12. The method of claim 11 further including the step of using said sensed melt pressure to control the position of said ram during translation of said ram from said injection sequence to a hold and pack sequence.

13. The method of claim 11 further including in the determining step the step of estimating inertia and frictional forces exerted on and by the mechanical components causing translation movement of said ram.

14. An injection molding machine, comprising:
   an injection unit with a motor drive powering an electric motor to provide longitudinal translation of an injection ram for pressurizing a melt for injection into a mold cavity during a molding cycle;
   a processor having stored in memory a model routine and a melt pressure observer routine;
   said model having at least one state equation indicative of translation forces of said injection ram; and,
   said melt pressure observer receiving a first input value representative of one of motor velocity and motor position from said injection molding machine and a second input value representative of one of motor current and motor torque from said injection molding machine, and providing a current melt pressure value according to said first and second input values using said model.

15. The injection molding machine of claim 14, further comprising a controller having said processor operatively coupled with said motor drive to control said longitudinal translation of said injection ram, wherein said controller includes a control law routine providing a control signal to said motor drive according to a current machine state so as to effectuate a desired translation of said injection ram in a controlled fashion, wherein said current machine state comprises said current melt pressure value, and wherein said control law provides said control signal to said motor drive according to said current melt pressure value, whereby sensorless pressure control is achieved in said injection molding machine.

16. The injection molding machine of claim 14, further comprising a user interface operatively coupled with said controller to receive said current melt pressure value therefrom and to render said current pressure value to a user.

17. A computerized control system for controlling by programmed routines stored in memory an injection ram in an injection molding machine using an electric motor, said control system comprising:
   a model simulating behavioral characteristics of said injection molding machine and having at least one state equation representative of ram translational force;
   a melt pressure observer operatively associated with said injection molding machine and solving said at least one state equation to provide a current melt pressure value according to first and second input values using said model, wherein said first input value is indicative of one of a velocity and a position associated with said electric motor, and wherein said second input value is indicative of one of a current and a torque associated with said electric motor; and,
   a control law providing a control signal to a motor drive associated with said electric motor using said current machine state so as to achieve a desired translation of said injection ram in a controlled fashion without sensing pressure.

18. The control system of claim 17, wherein said current machine state comprises said current melt pressure value, and wherein said control law provides said control signal to said motor drive according to said current melt pressure value, whereby said control law accounts for said current melt pressure without sensing thereof.

19. The control system of claim 17, wherein said first input value is obtained from one of a velocity sensor and a position sensor associated with said injection molding machine, and wherein said second input value is obtained from said motor drive.

20. The control system of claim 17, wherein said at least one state equation comprises a melt pressure equation, which is a function of motor acceleration and motor torque, and wherein said melt pressure observer solves said melt pressure equation using said first and second input values to provide said current melt pressure value.

21. The control system of claim 20, wherein said first input value is indicative of a motor velocity, wherein said at least one state equation comprises a motor acceleration equation, which is a function of motor velocity, and wherein said melt pressure observer solves said motor acceleration equation using said first input value to provide a motor acceleration value and solves said melt pressure equation using said motor acceleration value and said second input value to provide said current melt pressure value.

22. The control system of claim 20, wherein said first input value is indicative of a motor position, wherein said at least one state equation comprises a motor velocity equation, which is a function of motor position and a motor acceleration equation, which is a function of motor velocity, and wherein said melt pressure observer solves said motor velocity equation using said first input value to provide a motor velocity value, solves said motor acceleration equation using said motor velocity value to provide a motor acceleration value, and solves said melt pressure equation using said motor acceleration value and said second input value to provide said current melt pressure value.

23. The control system of claim 20, wherein said second input value is indicative of motor torque, and wherein said melt pressure observer solves said melt pressure equation using said first and second input values to provide said current melt pressure value.

24. The control system of claim 20, wherein said second input value is indicative of motor current, wherein said at least one state equation comprises a motor torque equation, which is a function of motor current, and wherein said melt pressure observer solves said motor torque equation using said second input value to provide a motor torque value and solves said melt pressure equation using said first input value and said motor torque value to provide said current melt pressure value.

25. The control system of claim 20, wherein said second input value is indicative of motor current, wherein said model comprises a lookup table having values correlating current and torque for said electric motor, and wherein said melt pressure observer obtains a motor torque value from said lookup table using said second input value and solves said melt pressure equation using said first input value and said motor torque value to provide said current melt pressure value.

26. The control system of claim 20, wherein said current machine state comprises said current melt pressure value, and wherein said control law provides said control signal to said motor drive according to said current melt pressure value, whereby said control law accounts for said current melt pressure without sensing melt pressure.

27. The control system of claim 20, wherein said first input value is obtained from one of a velocity sensor and a position sensor associated with said injection molding machine, and wherein said second input value is obtained from said motor drive.

28. A system for sensorless estimation of a melt pressure in an injection molding machine having an injection unit providing longitudinal translation of an injection ram to pressurize a melt for injection into a mold cavity, said system comprising:
  at least one state equation representative of behavior of an injection molding machine;
  an observer component operatively associated with said injection molding machine to solve said at least one state equation to provide a current melt pressure value without sensing pressure; and,
  said observer component is operative to solve said at least one state equation according to first and second input values from said injection molding machine, wherein said first input value is indicative of one of a velocity and a position associated with an electric motor adapted to provide longitudinal translation of said injection ram, and wherein said second input value is indicative of one of a current and a torque associated with said electric motor.

29. The system of claim 28, wherein said at least one state equation comprises a melt pressure equation, which is a function of motor acceleration and motor torque, and wherein said observer component solves said melt pressure equation using said first and second input values to provide said current melt pressure value.

30. The system of claim 29, wherein said first input value is indicative of a motor velocity, wherein said at least one state equation comprises a motor acceleration equation, which is a function of motor velocity, and wherein said observer component solves said motor acceleration equation using said first input value to provide a motor accceleration value and solves said melt pressure equation using said motor acceleration value and said second input value to provide said current melt pressure value.

31. The system of claim 29, wherein said first input value is indicative of a motor position, wherein said at least one state equation comprises a motor velocity equation, which is a function of motor position and a motor acceleration equation, which is a function of motor velocity, and wherein said observer component solves said motor velocity equation using said first input value to provide a motor velocity value, solves said motor acceleration equation using said motor velocity value to provide a motor acceleration value, and solves said melt pressure equation using said motor acceleration value and said second input value to provide said current melt pressure value.

32. The system of claim 29, wherein said second input value is indicative of motor torque, and wherein said observer component solves said melt pressure equation using said first and second input values to provide said current melt pressure value.

33. The system of claim 29, wherein said second input value is indicative of motor current, wherein said at least one state equation comprises a motor torque equation, which is a function of motor current, and wherein said observer component solves said motor torque equation using said second input value to provide a motor torque value and solves said melt pressure equation using said first input value and said motor torque value to provide said current melt pressure value.

34. The system of claim 29, wherein said second input value is indicative of motor current, wherein said state equation resides in a model component simulating behavior of said injection molding machine and having a lookup table having values correlating current and torque for said electric motor, and wherein said observer component obtains a motor torque value from said lookup table using said second input value and solves said melt pressure equation using said first input value and said motor torque value to provide said current melt pressure value.

35. In an injection molding machine having an electrically driven in-line reciprocating screw, a controller for controlling said position of said screw as a function of a pressure of a melt in said mold, an improvement comprising:
  a first sensor for sensing a first variable in said molding machine indicative of position, velocity and/or acceleration;
  a second sensor for sensing a second variable in said molding machine indicative of current and/or torque of the electric motor causing translational movement of said screw; and,
  said controller having a programmed routine for determining said pressure of said melt at any current time in a molding cycle given only said first and second variables, and wherein said first and second sensors do not comprise a pressure transducer measuring melt pressure or a force transducer measuring axial force on said screw whereby pressure on the screw is measured without any sensor directly measuring same.

36. The improvement of claim 35, wherein said controller has programmed routines comprising:
  a model component having at least one state equation representative of behavior of an injection molding machine; and,
  an observer component operatively associated with said injection molding machine and said model component to solve said at least one state equation to provide a current melt pressure value according to said first and second variables using said model component without sensing pressure.

37. The injection molding machine of any of claims 14, 17, and 36 wherein said model determines the affect of inertia and friction on the mechanical components of the injection unit producing the translation forces of said ram.

38. A computer-readable medium having computer-executable instructions for controlling longitudinal translation of an injection ram in an injection molding machine using an electric motor to cause said longitudinal translation and comprising computer-executable instructions for:
  obtaining a first input value indicative of one of a velocity and a position associated with said electric motor;
  obtaining a second input value indicative of one of a current and a torque associated with said electric motor; and, solving at least one state equation representative of forces imposed on a melt by said ram to provide a current melt pressure value according to said first and second input values without sensing pressure.

39. The computer-readable medium of claim 38, wherein said current machine state comprises said current melt pressure value, further comprising computer-executable instructions for providing a control signal to said motor drive according to said current melt pressure value, whereby said control signal accounts for said current melt pressure without sensing thereof.

40. The computer-readable medium of claim 38, wherein said computer-executable instructions for obtaining said first input value comprise computer-executable instructions for obtaining a first sensor value from one of a velocity sensor and a position sensor associated with said injection molding machine, and wherein said computer-executable instructions for obtaining said second input value comprise computer-executable instructions for obtaining a second input value indicative of one of an electrical current and a torque associated with said electric motor from said motor drive.

41. The computer-readable medium of claim 38, wherein said at least one state equation comprises a melt pressure equation, which is a function of motor acceleration and motor torque, and wherein said computer-executable instructions for solving at least one state equation comprise computer-executable instructions for solving said melt pressure equation using said first and second input values to provide said current melt pressure value.

42. The computer-readable medium of claim 41, wherein said first input value is indicative of a motor velocity, wherein said at least one state equation comprises a motor acceleration equation, which is a function of motor velocity, and wherein said computer-executable instructions for solving at least one state equation comprise computer-executable instructions for solving said motor acceleration equation using said first input value to provide a motor acceleration value and computer-executable instructions for solving said melt pressure equation using said motor acceleration value and said second input value to provide said current melt pressure value.

43. The computer-readable medium of claim 41, wherein said first input value is indicative of a motor position, wherein said at least one state equation comprises a motor velocity equation, which is a function of motor position and a motor acceleration equation, which is a function of motor velocity, and wherein said computer-executable instructions for solving at least one state equation comprise computer-executable instructions for solving said motor velocity equation using said first input value to provide a motor velocity value, computer-executable instructions for solving said motor acceleration equation using said motor velocity value to provide a motor acceleration value, and computer-executable instructions for solving said melt pressure equation using said motor acceleration value and said second input value to provide said current melt pressure value.

44. The computer-readable medium of claim 41, wherein said second input value is indicative of motor torque, and wherein said computer-executable instructions for solving at least one state equation comprise computer-executable instructions for solving said melt pressure equation using said first and second input values to provide said current melt pressure value.

45. The computer-readable medium of claim 41, wherein said second input value is indicative of motor current, wherein said at least one state equation comprises a motor torque equation, which is a function of motor current, and wherein said computer-executable instructions for solving at least one state equation comprise computer-executable instructions for solving said motor torque equation using said second input value to provide a motor torque value and computer-executable instructions for solving said melt pressure equation using said first input value and said motor torque value to provide said current melt pressure value.

46. The computer-readable medium of claim 41, wherein the second input value is indicative of motor current, further comprising a lookup table having values correlating current and torque for said electric motor, and wherein said computer-executable instructions for solving at least one state equation comprise computer-executable instructions for obtaining a motor torque value from said lookup table using said second input value and computer-executable instructions for solving said melt pressure equation using said first input value and said motor torque value to provide said current melt pressure value.

* * * * *